(12) United States Patent
Zheng et al.

(10) Patent No.: US 8,108,985 B2
(45) Date of Patent: Feb. 7, 2012

(54) METHOD FOR MANUFACTURING A PERPENDICULAR MAGNETIC WRITE HEAD

(75) Inventors: Yi Zheng, San Ramon, CA (US); Yimin Hsu, Sunnyvale, CA (US); Wen-Chien David Hsiao, San Jose, CA (US); Ming Jiang, San Jose, CA (US); Aron Pentek, San Jose, CA (US); Sue Siyang Zhang, Saratoga, CA (US); Edward Hin Pong Lee, San Jose, CA (US); Hung-Chin Guthrie, Saratoga, CA (US); Ning Shi, San Jose, CA (US); Vladimir Nikitin, Campbell, CA (US); Prabodh Ratnaparkhi, San Jose, CA (US); Yinshi Liu, Foster City, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1131 days.

(21) Appl. No.: 11/934,687

(22) Filed: Nov. 2, 2007

(65) Prior Publication Data

US 2009/0117407 A1    May 7, 2009

(51) Int. Cl.
*G11B 5/127* (2006.01)
*H04R 31/00* (2006.01)

(52) U.S. Cl. ............... 29/603.14; 29/603.13; 29/603.15; 29/603.16; 29/603.18; 360/121; 360/122; 360/317

(58) Field of Classification Search ............... 29/603.11, 29/603.13–603.16, 603.18, 605, 606; 216/22, 216/39, 41, 48, 62, 65–67; 360/121, 212, 360/317; 451/5, 41
See application file for complete search history.

(56) References Cited

U.S. PATENT DOCUMENTS

| | | | |
|---|---|---|---|
| 5,141,623 A | 8/1992 | Cohen et al. | 205/122 |
| 5,406,434 A | 4/1995 | Amin et al. | 360/126 |
| 5,673,463 A | 10/1997 | Chih-wen | 24/265 |
| 6,345,435 B1 * | 2/2002 | Han et al. | 29/603.14 |
| 6,445,536 B1 | 9/2002 | Rudy et al. | 360/126 |
| 6,578,252 B2 | 6/2003 | Sasaki | 29/603.12 |
| 6,609,948 B1 | 8/2003 | Fontana, Jr. et al. | 451/5 |
| 6,612,017 B2 | 9/2003 | Santini | 29/603.12 |
| 6,754,947 B2 | 6/2004 | Stageberg et al. | 29/603.12 |
| 7,002,775 B2 | 2/2006 | Hsu et al. | 360/125 |
| 7,131,186 B2 | 11/2006 | Sasaki et al. | 29/603.15 |
| 2003/0035251 A1 | 2/2003 | Asida et al. | 360/322 |
| 2004/0114282 A1 | 6/2004 | Pong Lee et al. | 360/322 |
| 2006/0070231 A1 | 4/2006 | Baer et al. | 29/603.01 |

* cited by examiner

*Primary Examiner* — Paul D Kim
(74) *Attorney, Agent, or Firm* — Zilka-Kotab, PC

(57) ABSTRACT

A method for manufacturing a magnetic write head for perpendicular magnetic recording. The method includes forming a write pole, and then depositing a refill layer. A mask structure can be formed over the writ pole and refill layer, the mask structure being configured to define a stitched pole. An ion milling or reactive ion milling can then be performed to remove portions of the refill layer that are not protected by the mask structure. Then a magnetic material can be deposited to form a stitched write pole that defines a secondary flare point. The stitched pole can also be self aligned with an electrical lapping guide in order to accurately locate the front edge of the secondary flare point relative to the air bearing surface of the write head.

6 Claims, 50 Drawing Sheets

METHOD FOR MANUFACTURING A PERPENDICULAR MAGNETIC WRITE HEAD

FIELD OF THE INVENTION

The present invention relates to perpendicular magnetic recording and more particularly to a magnetic write head having a stitched write pole with a secondary flare point and a self aligned trailing magnetic shield.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Certain design parameters are important to efficient write head performance, such as, for example, the flare point of the write head. However, as the write heads become ever smaller, it becomes ever more difficult to control these desired parameters to the accuracy needed. Therefore, there is a need for a structure and/or method of manufacture that can allow these write head parameters to be accurately controlled even in very small write heads.

SUMMARY OF THE INVENTION

The present invention provides a method for manufacturing a magnetic write head for perpendicular magnetic recording. The method provides for the formation of a secondary flare point having a front edge that can be very accurately located relative to an air bearing surface. The method includes forming a write pole and then depositing a refill layer. A mask structure is formed having an opening that is configured to define a secondary flare point. A material removal process such as ion milling or reactive ion milling can then be performed to remove material from the area that is not covered by the mask. A magnetic material can then be deposited to form a stitched pole that is magnetically connected with the write pole.

The method can also advantageously be used to construct a self aligned electrical lapping guide. The lapping guide can be defined by the same masking step used to define the stitched pole. In this way, the front edge of the stitched pole (i.e. the secondary flare point) can be very accurately spaced from the air bearing surface, by using the self aligned lapping guide to indicate when lapping should be terminated during a lapping operation used to define the air bearing surface.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
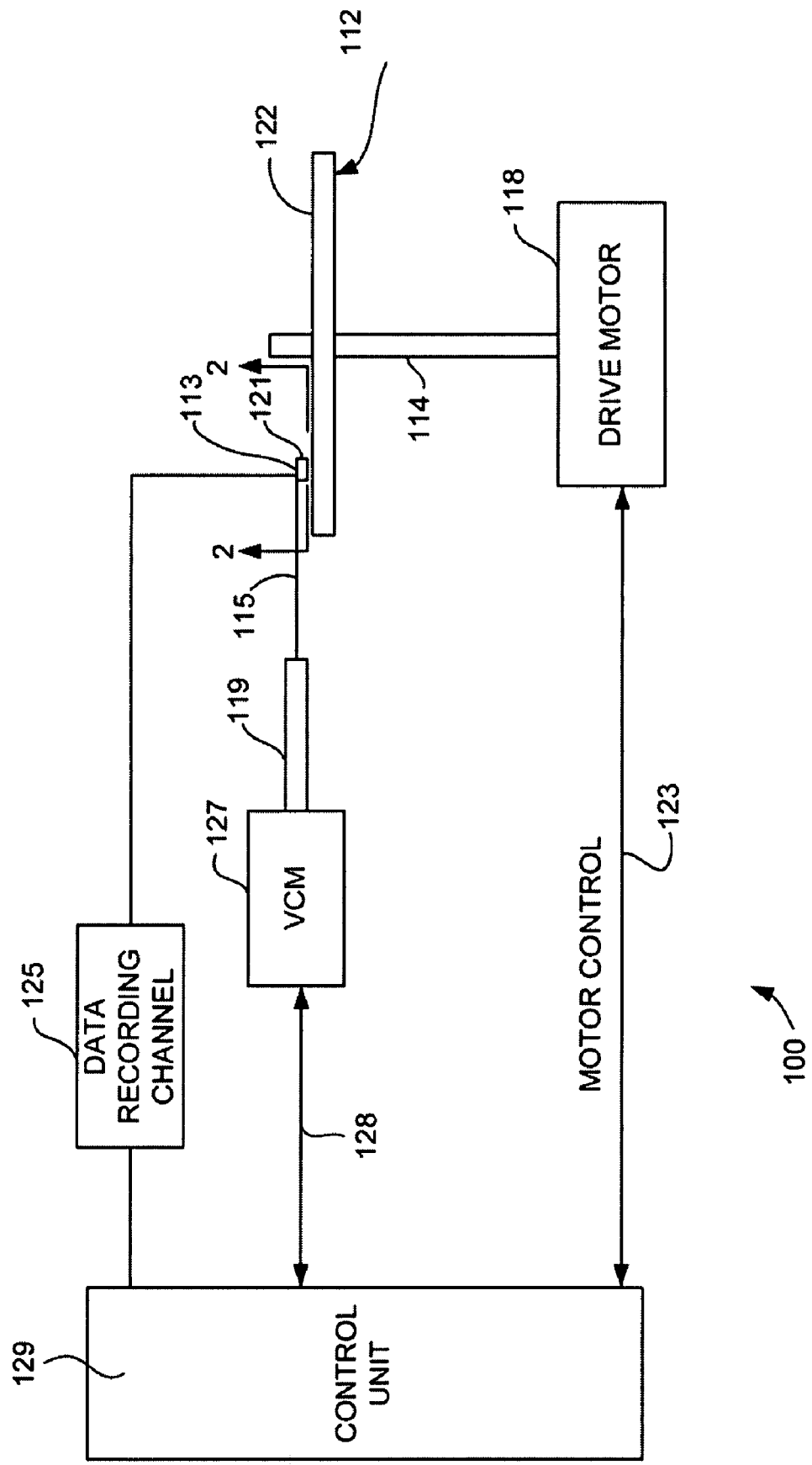
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
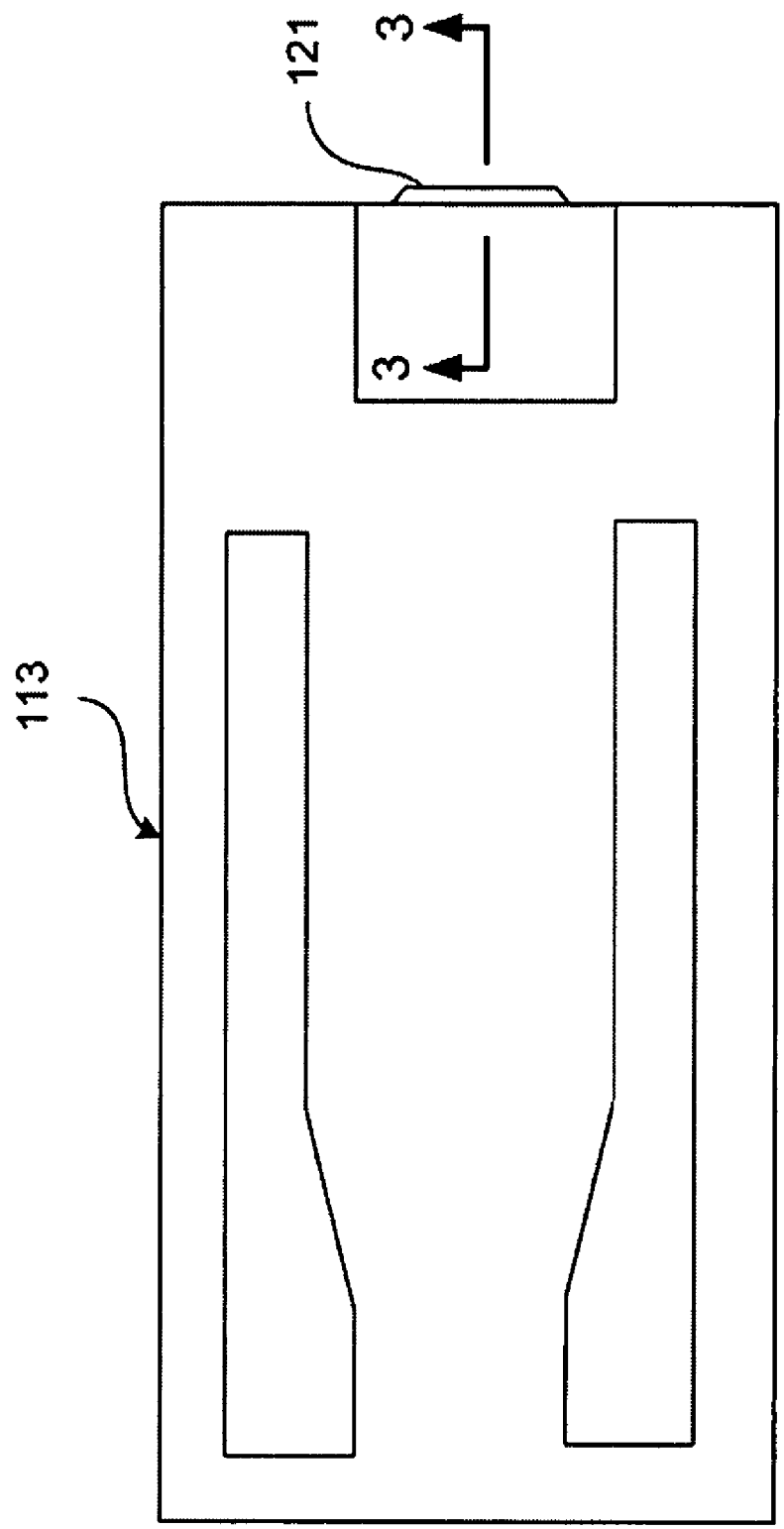
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
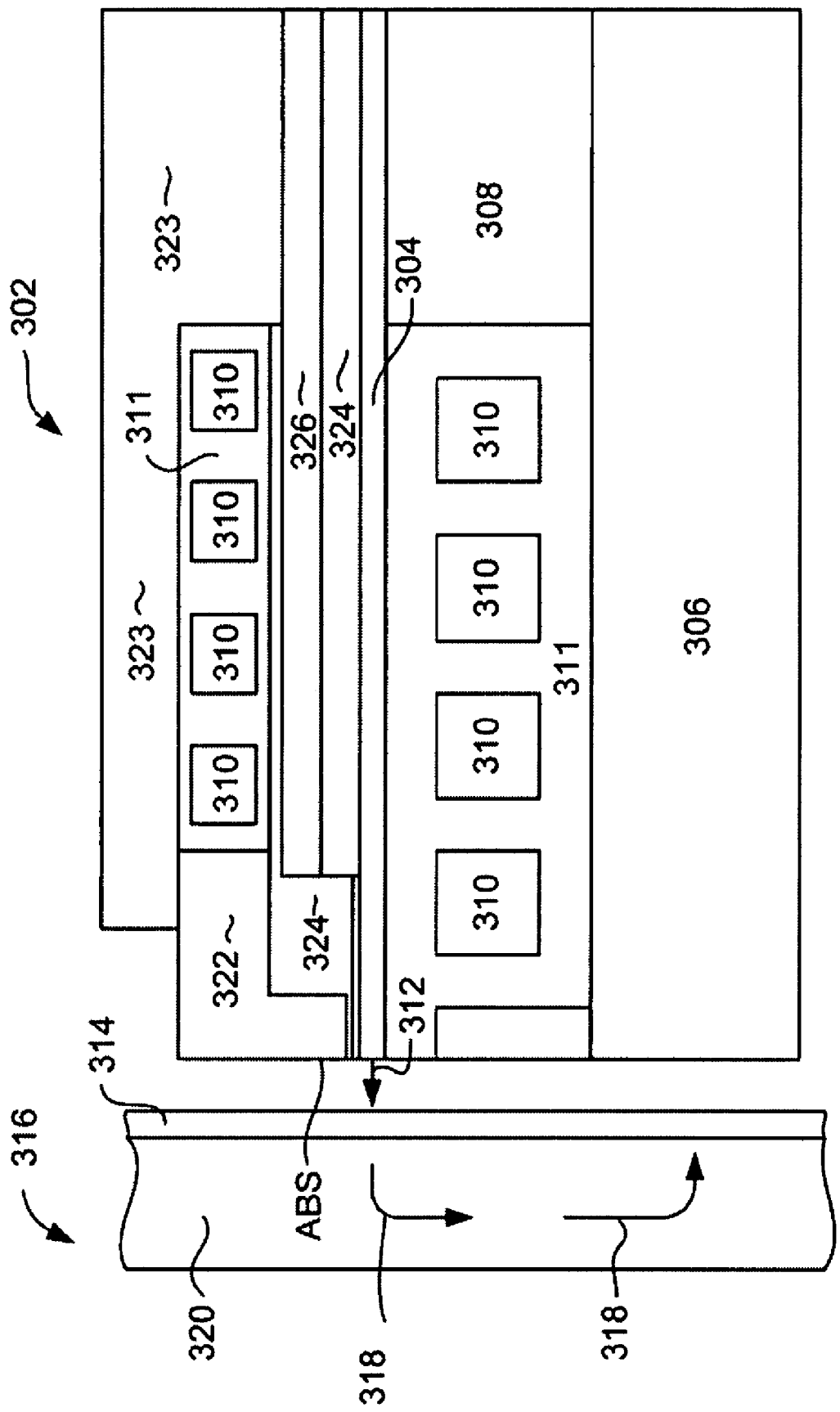
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic write head 302. The write head includes a write pole 304 and a first, or leading, return pole 306. The return pole has a cross section at the air bearing surface (ABS) that is much larger than that of the write pole. The write pole 304 and return pole 306 can be magnetically connected at a back gap 308 located away from the ABS. An electrically conductive, non-magnetic write coil 310, shown in cross section in FIG. 3 passes through the write head 302, and can be embedded in a non-magnetic, electrically insulating coil insulation layer 311. When current flows through the write coil 310, a magnetic field is produced, which induces a magnetic flux through the write pole 304. This magnetic flux causes a highly concentrated write field 312 to be emitted from the write pole 312, which locally magnetizes a magnetically hard top layer 314 of a magnetic medium 316. A resulting magnetic flux 318 flows through a magnetically softer under-layer of the magnetic medium 316 to return to the return pole 306 where it is sufficiently spread out that it does not magnetize the top layer 314.

A magnetic trailing shield 322 can be provided at the ABS and is separated from the trailing edge of the write pole 304 by a non-magnetic trailing gap layer 324. The trailing shield 322 can be magnetically connected with the back gap layer 308 by a second, or trailing, magnetic pole 323.

A magnetic stitched pole 324 is formed over the write pole 304 and as will be discussed below, provides a secondary flare point that is self aligned and easily, accurately and reliably located relative to the ABS. A non-magnetic spacer 326 is formed over the stitched pole 324, and each of the stitched pole and non-magnetic spacer 326 can be formed as a magnetic shell that wraps around the trailing edge and sides of the write pole 304 (although this is not shown in FIG. 3).

The presence of the trailing magnetic shield 322 adjacent to the trailing edge of the write pole 304 increases write speed by increasing the field gradient of the write field 312. The smaller the gap between the trailing shield 322 and the write pole 304 the more the field gradient will be increased. However, if the trailing shield is too close to the write pole 304, the strength of the write field will suffer, because too much flux will be leak from the write pole 304 to the trailing shield 322. The non-magnetic spacer 326 ensures that the trailing shield 322 will be not be too close to the write pole 304 in regions removed from the ABS, thereby maximizing the field gradient increase provided by the trailing shield 322, while minimizing the loss of flux to the trailing shield 322.

Figure 4:
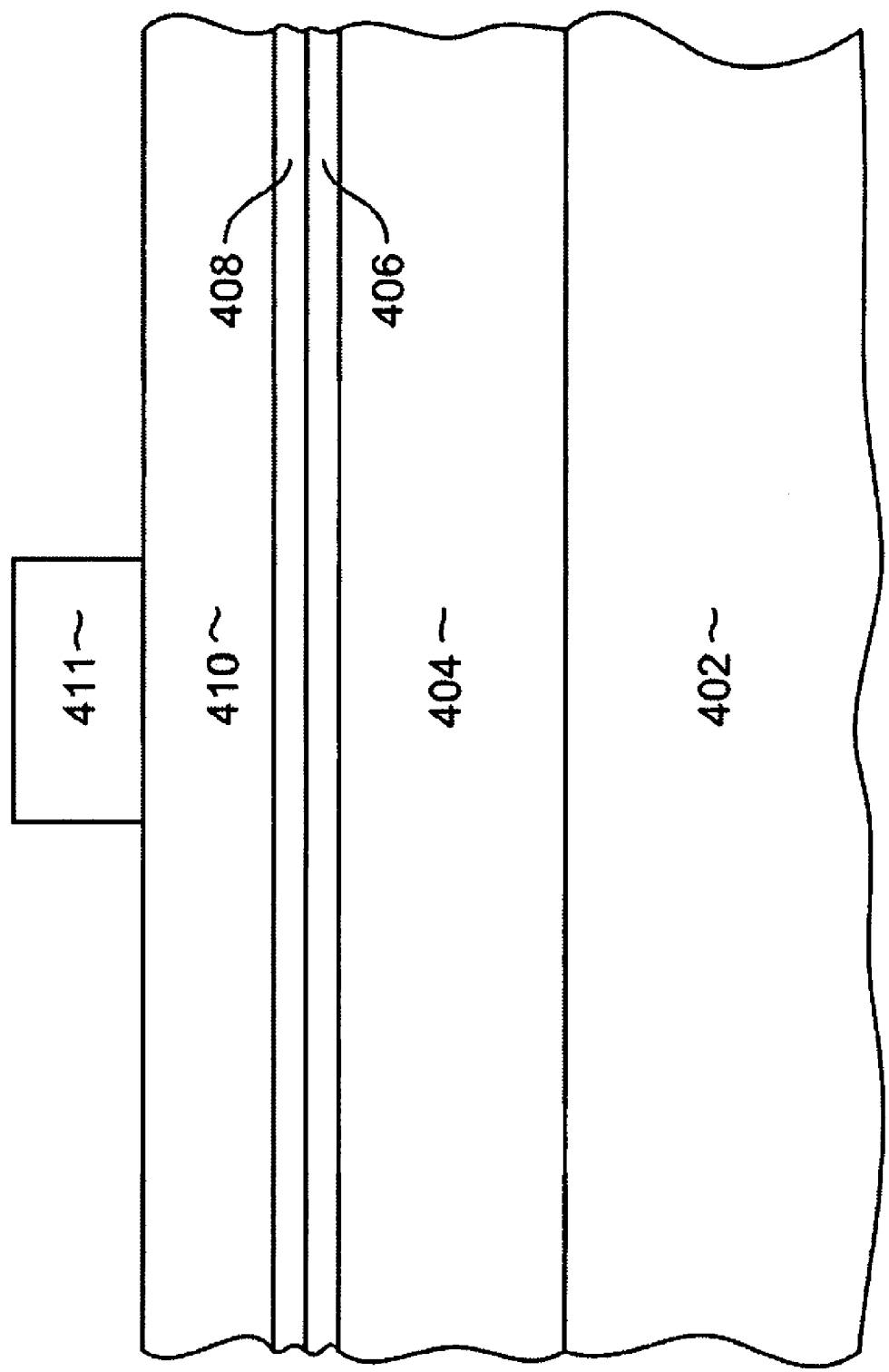
FIGS. 4-20 are illustrations of a write head in various intermediate stages of manufacture illustrating a method of manufacturing a magnetic write head according to an embodiment of the invention.

Self Aligned Shield and Flare with Stitched Short Flare Defined by Deposition:

The advantage of the structure described above will be better understood with reference to FIGS. 4-20 which illustrate a method of manufacturing a write head according to an embodiment of the invention. With particular reference to FIG. 4 a magnetic write pole material 404 (preferably a laminate of magnetic and non-magnetic layers) is deposited over the substrate. A series of mask layers 406, 408, 410 and 411 are then deposited over the write pole material 404. The layer 406 can be a hard mask material such as Ta—O and can have a thickness of, for example, 30 nm. A second hard mask layer 408, constructed of a material that is resistant to chemical mechanical polishing such as diamond like carbon (DLC), is deposited over the first hard mask layer 406. An image transfer layer 410 can be deposited over the second hard mask layer 408, and can be constructed of a non-photosensitive polyimide material such as DURIMIDE®. Finally, a mask material 411, such as photoresist, can be formed over the image transfer layer 410 and can be photolithographically patterned to define a desired write pole shape.

Figure 5:
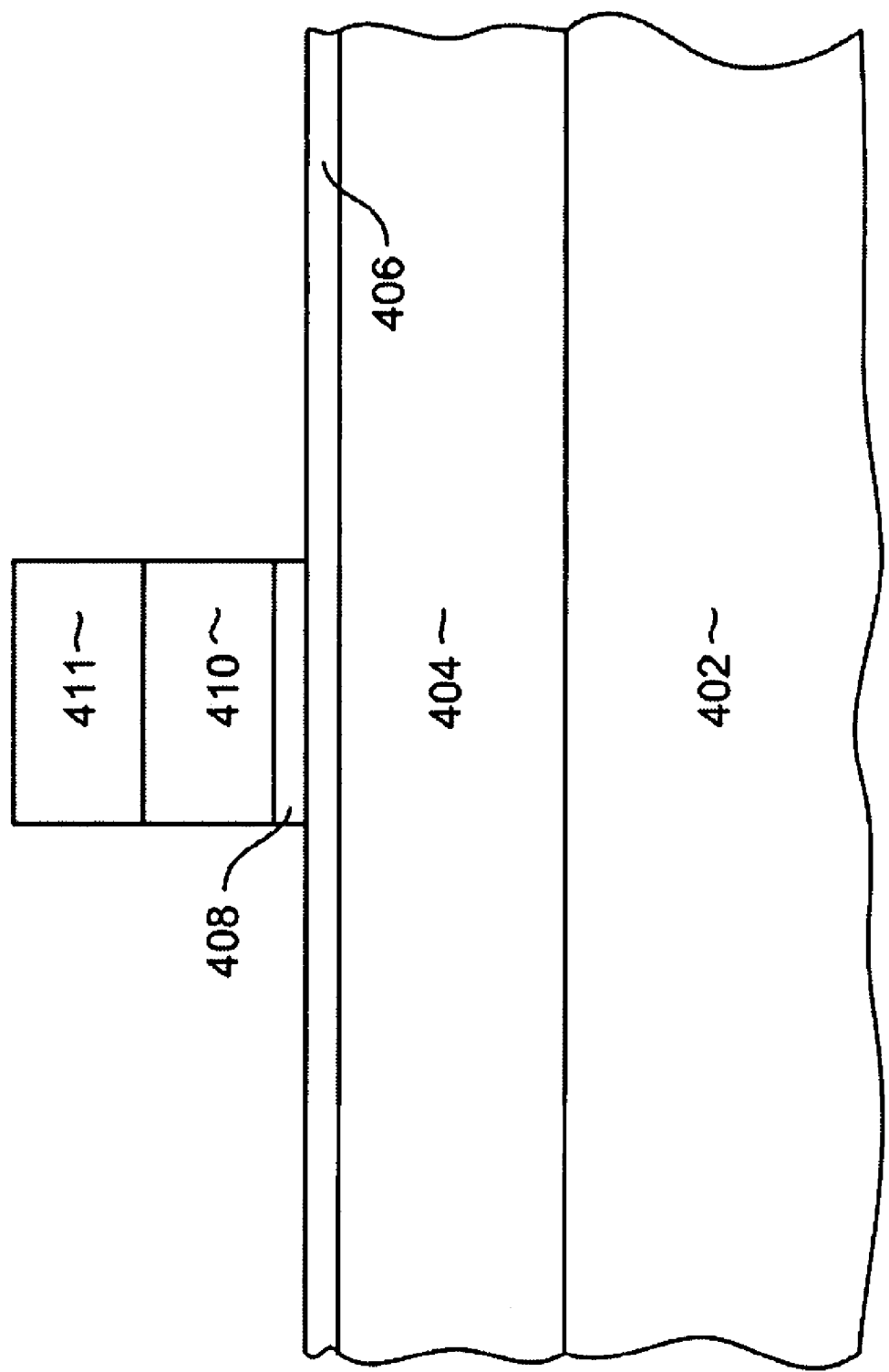
Figure 6:
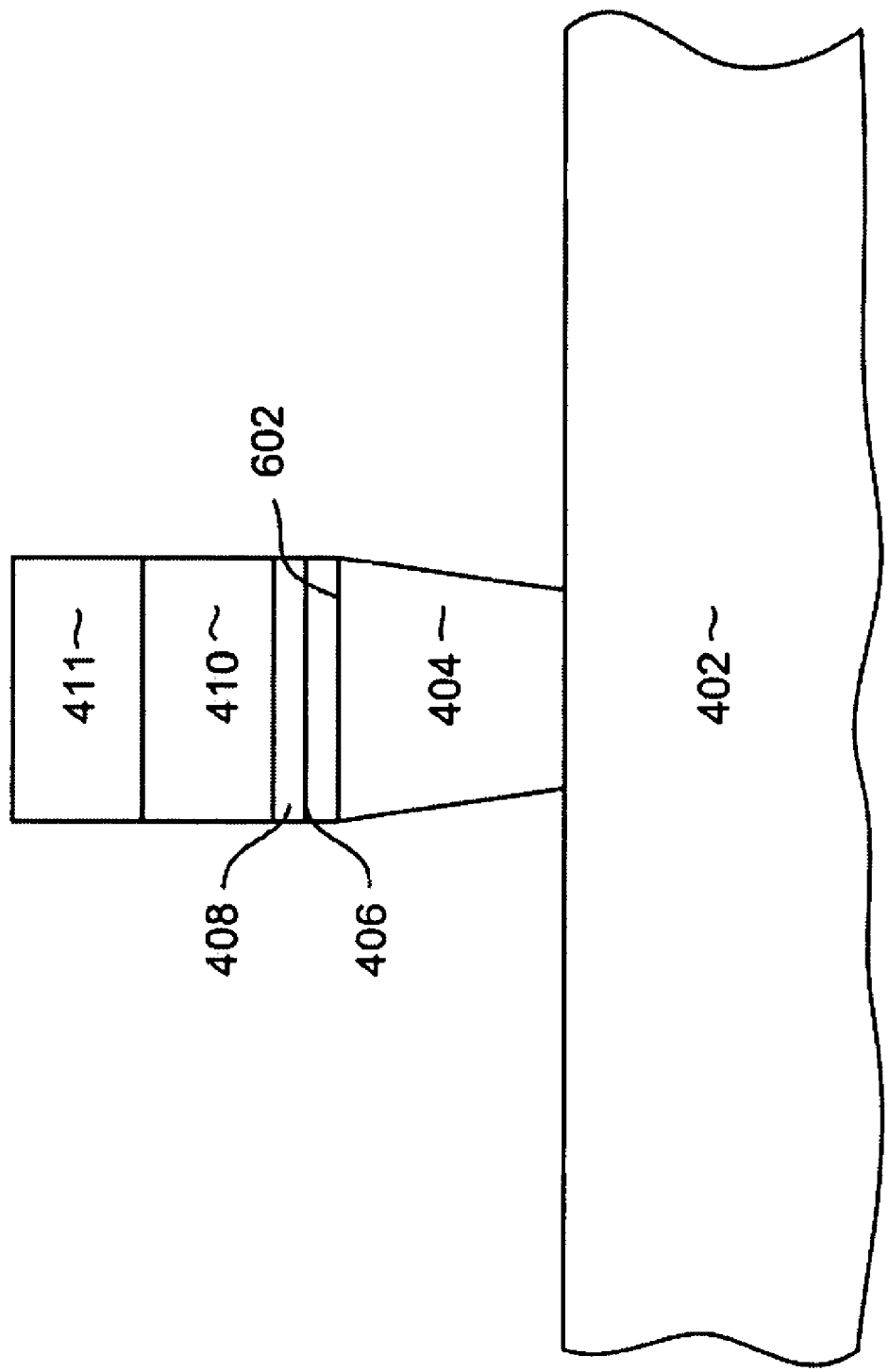

With reference now to FIG. 5, a reactive ion etch (RIE) is performed to transfer the image of the photoresist layer 411 onto the underlying layers 410 and 408. Then, with reference to FIG. 6, an ion milling process can be performed to remove portions of the layer 406 and the write pole material 404 that are not covered by the above mask layers 406, 408, 410, 411. The first hard mask 406 is beneficial in maintaining a straight, well defined trailing edge 602 on the write pole 404. Also, the ion milling is preferably performed at an angle, so as to form the write pole 404 with a tapered, trapezoidal shape.

Figure 7:
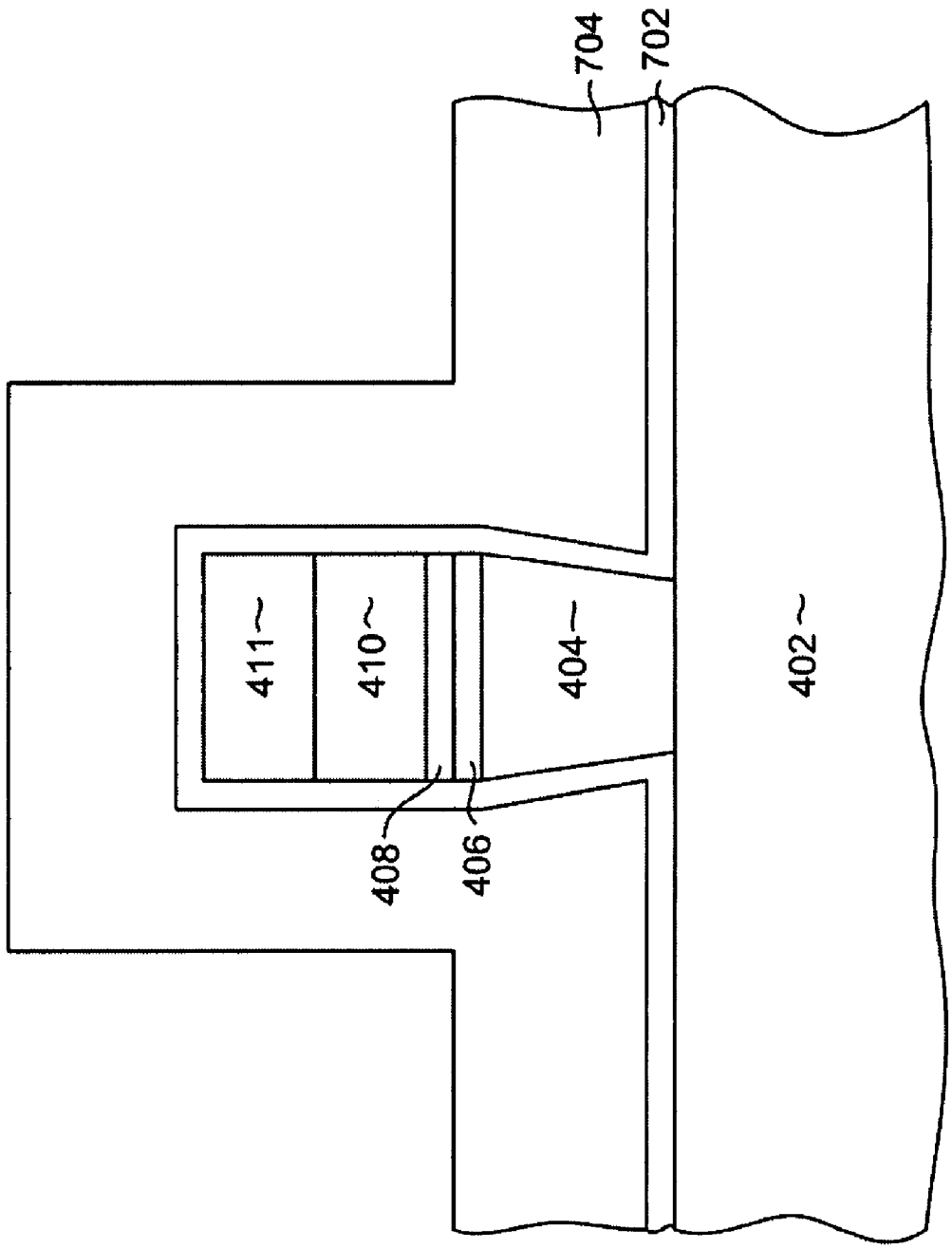
Figure 8:
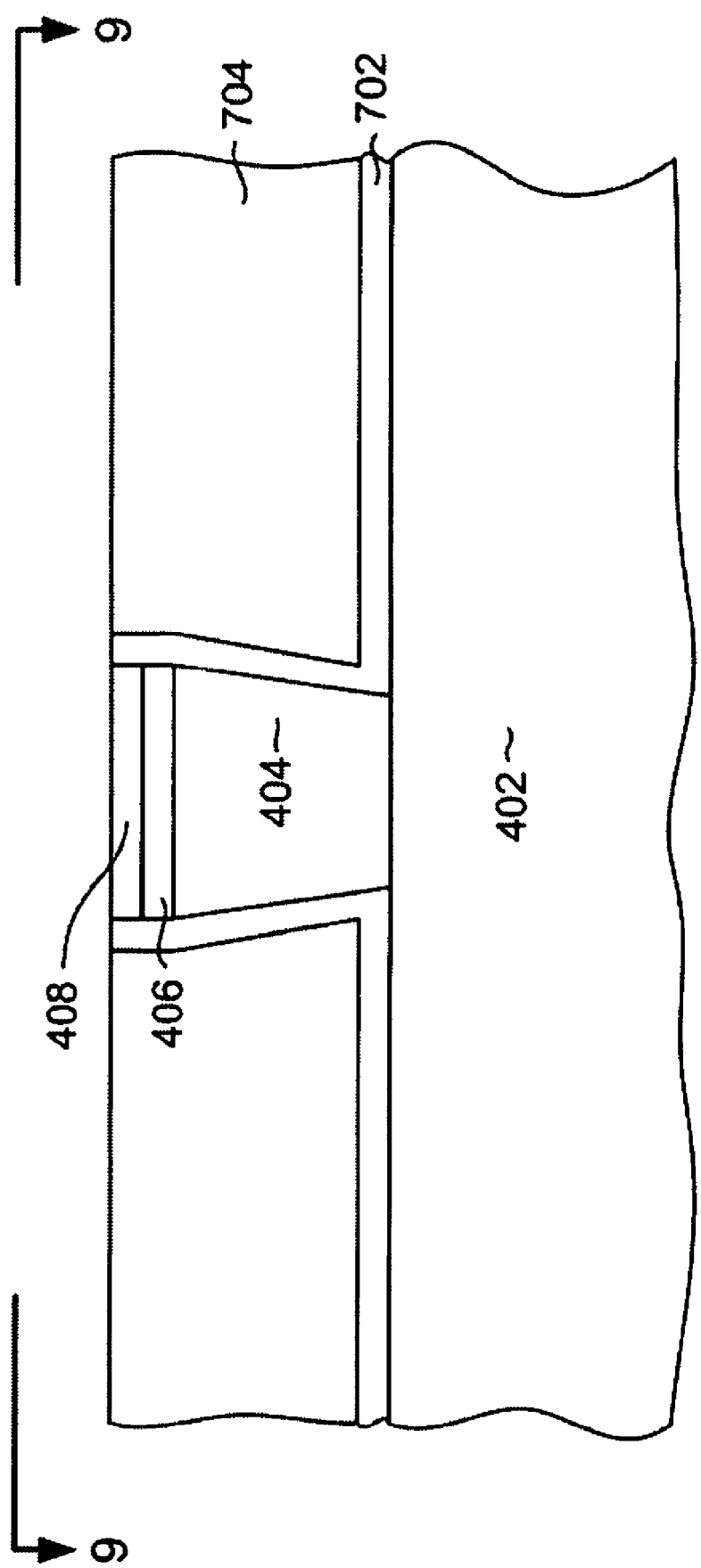

With reference now to FIG. 7, a layer of Fluorine RIE resistant material 702 such as 10 nm of diamond like carbon (DLC) or 5 nm of alumina (ALD) is deposited. A refill layer 704 such as 0.5-1 um of Si—N or $SiO_2$ is then deposited over the layer 702. Then, with reference to FIG. 8 a chemical mechanical polishing process (CMP) is performed to planarize the structure, stopping at the DLC layer 408.

Figure 9:
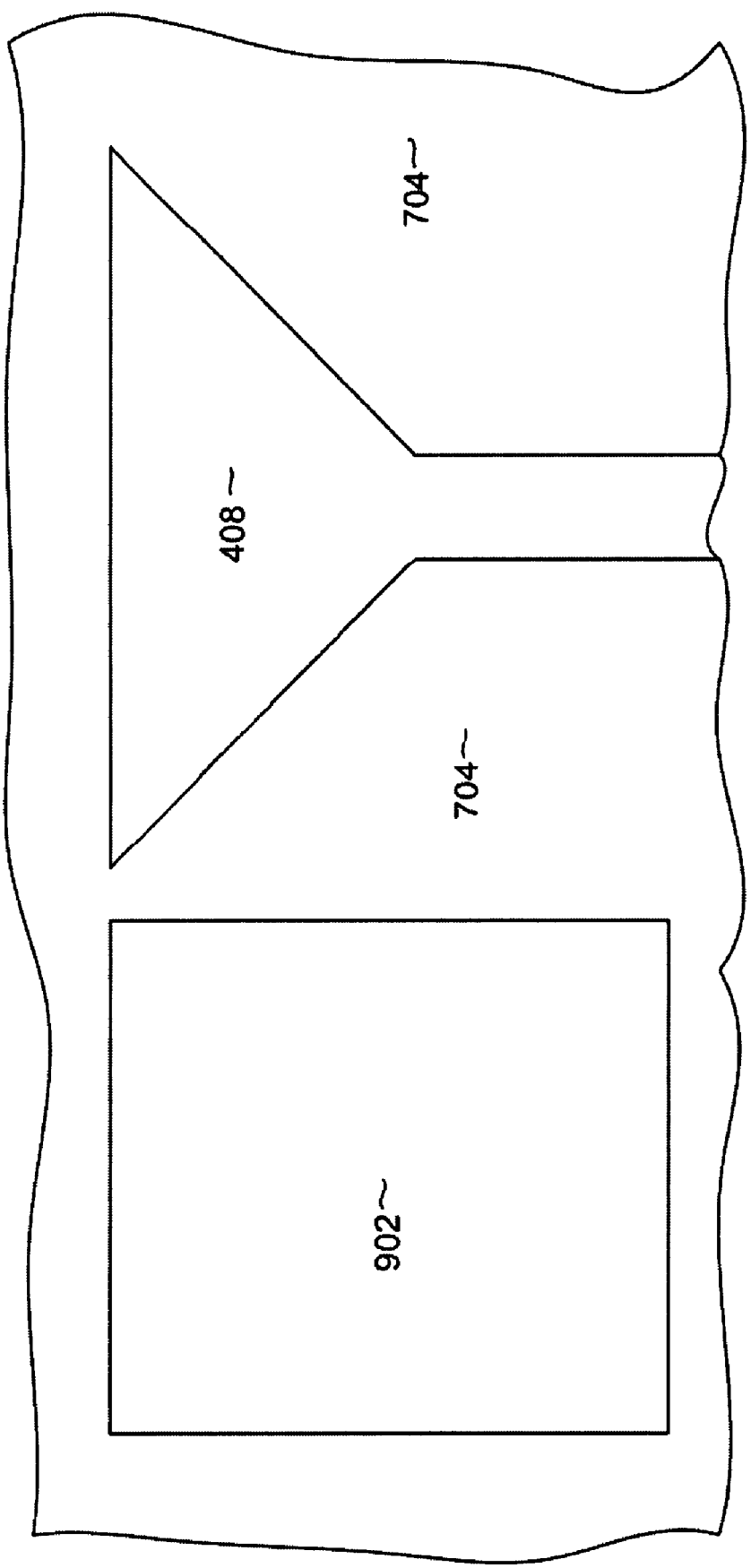
Figure 10:
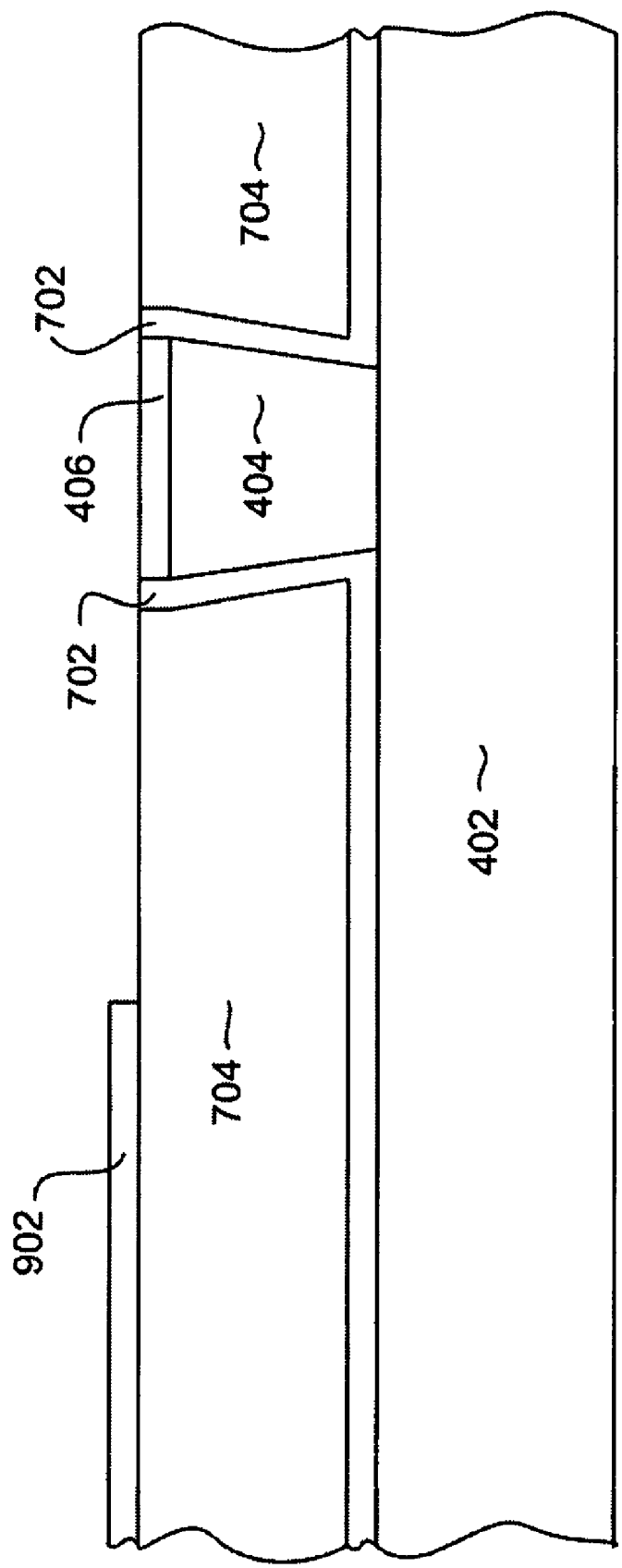

FIG. 9 shows a top down view of the structure described above. With reference now to FIGS. 9 and 10, a layer of electrically conducive lapping guide material (ELG material) 902 is deposited in a region where an electrical lapping guide (ELG) will be formed adjacent to the write pole. The ELG material can be deposited by a process such as a lift off process.

Figure 11:
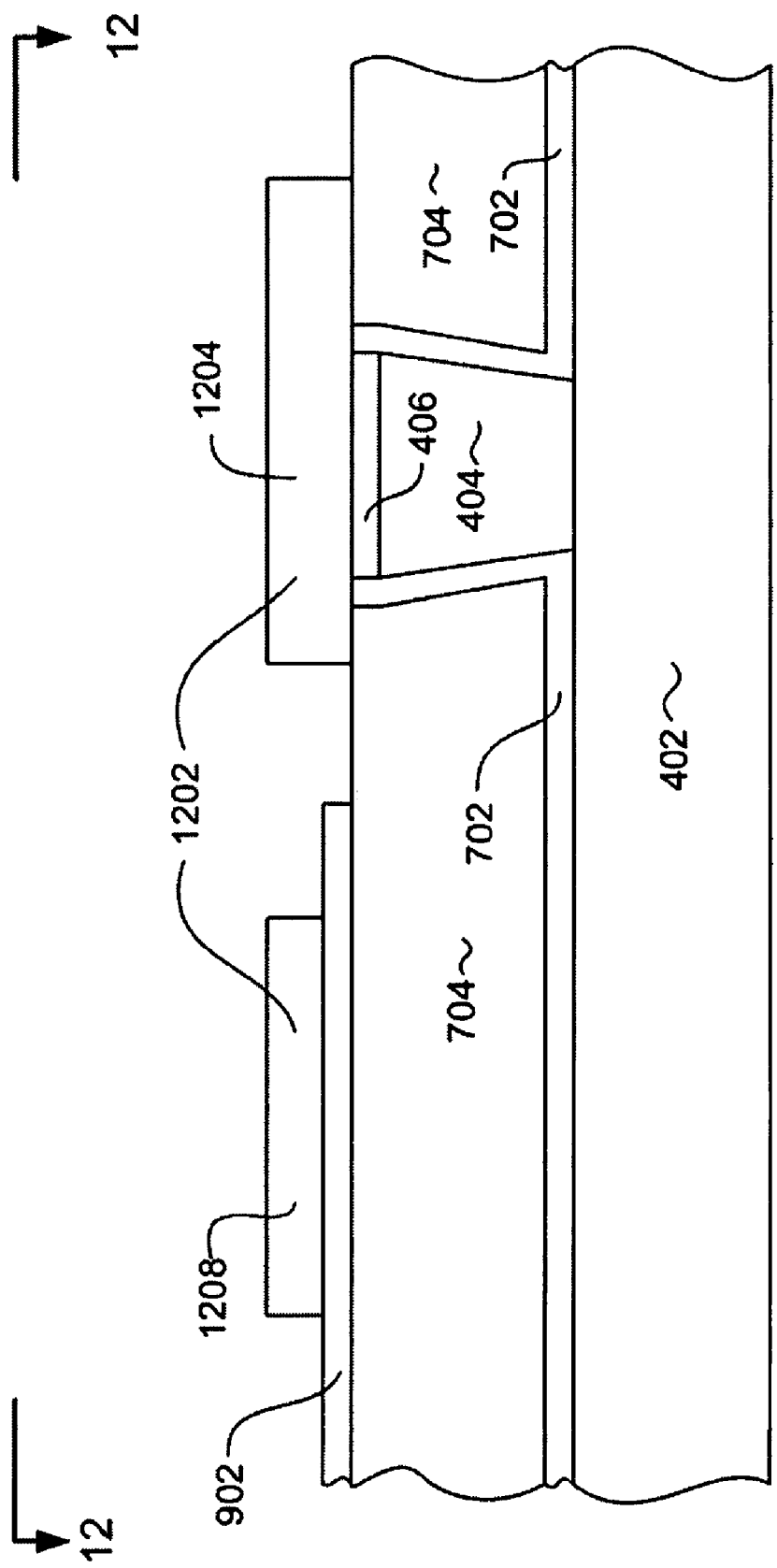
Figure 12:
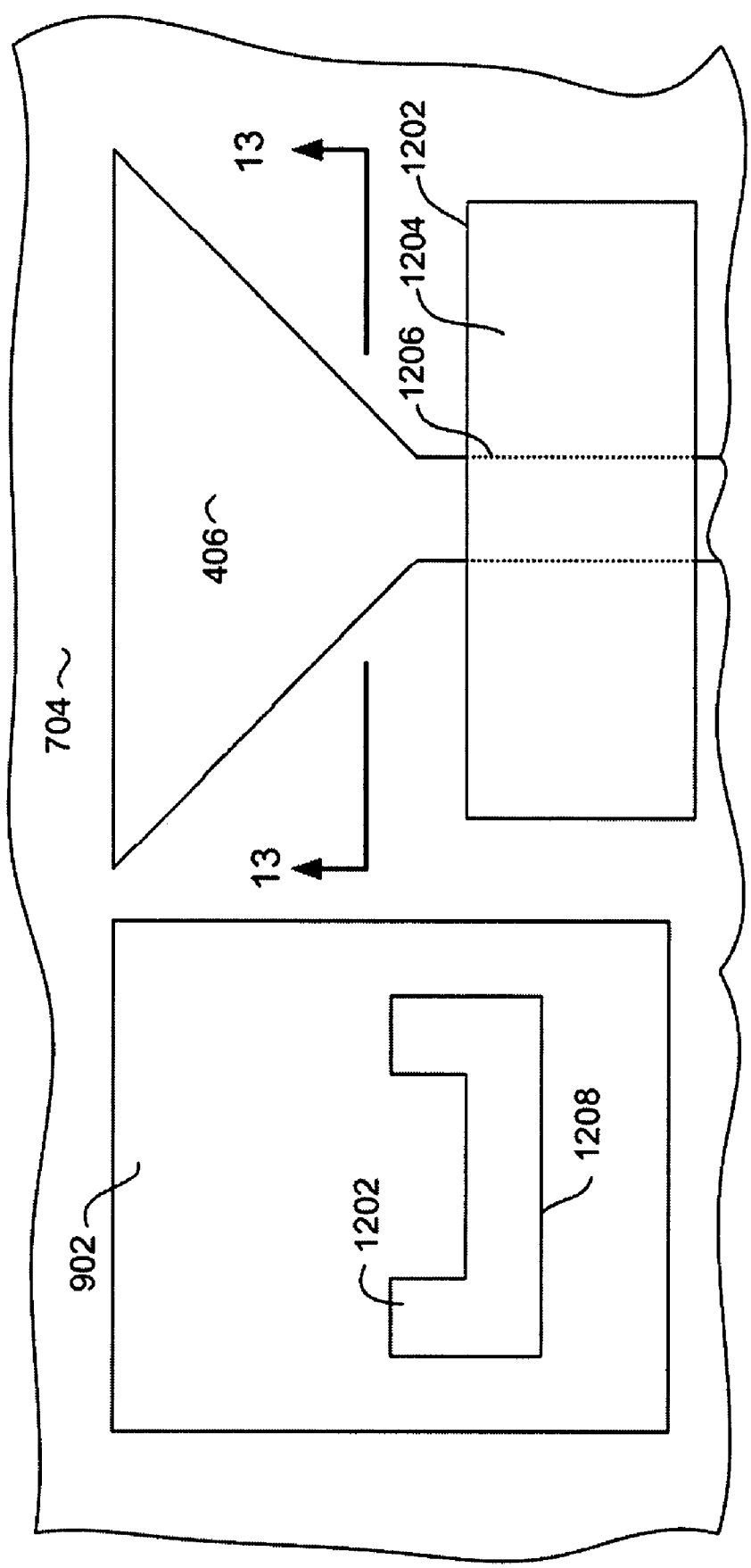

With reference now to FIGS. 11 and 12 a mask structure 1202 is formed, such as from photolithographically patterned photoresist. The mask 1202 includes a first portion 1204 that covers a portion of the hard mask 406 and write pole 404 hidden thereunder. As can be seen, this first portion 1204 is formed over a portion of the throat 1206 of the write pole and hard mask 406. The mask 1202 also includes a second portion 1208 formed over the ELG material 902. This second mask portion 1208 is configured to define an electrical lapping guide (ELG). A reactive ion etch (RIE) is then performed to remove portions of the fill layer 704 and ELG material 902 that are not protected by the mask layer 1202. A sweeping reactive ion milling can then be performed to remove residual fill material 704 from the sides of the write pole 404. A sweeping ion milling in an oxygen ($O_2$) atmosphere can also be performed to remove remaining DLC material 702 from the sides of the write pole 404 in regions not protected by the mask layer 1202. This completely exposes the write pole 404 (top and two sides) that are not covered by mask layer 1202 in preparation for depositing a magnetic material, which will be described below.

Figure 13:
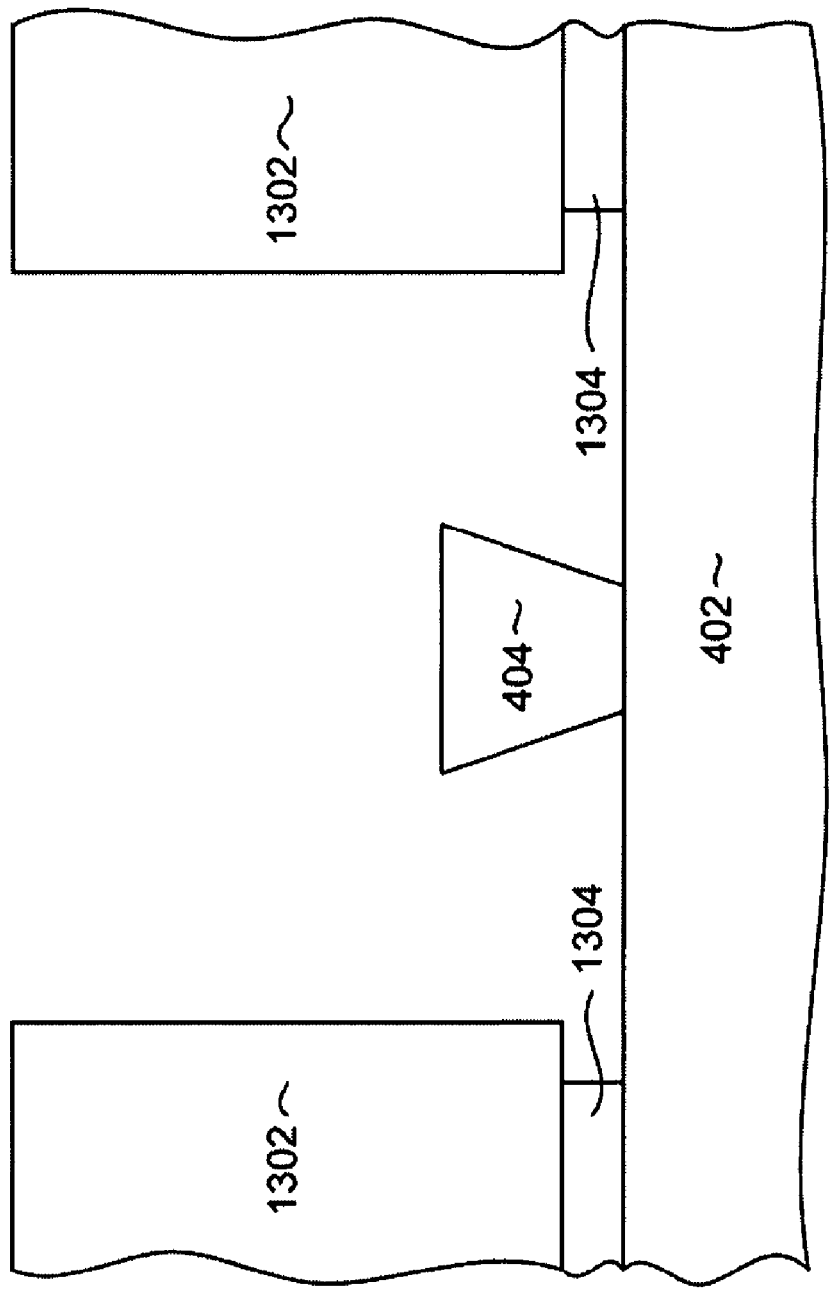

FIG. 13, shows a region outside of the mask layer 1202 where the fill layer 704, and layer 702 have been removed. Another mask structure 1302 is formed. The mask 1302 can be formed with the previously constructed mask 1202 (FIG. 12) still in place. The mask 1302 can be formed over a lift off material layer 1304 such as PMGI to facilitate lifting off the mask 1302 at a later point as will be seen.

Figure 14:
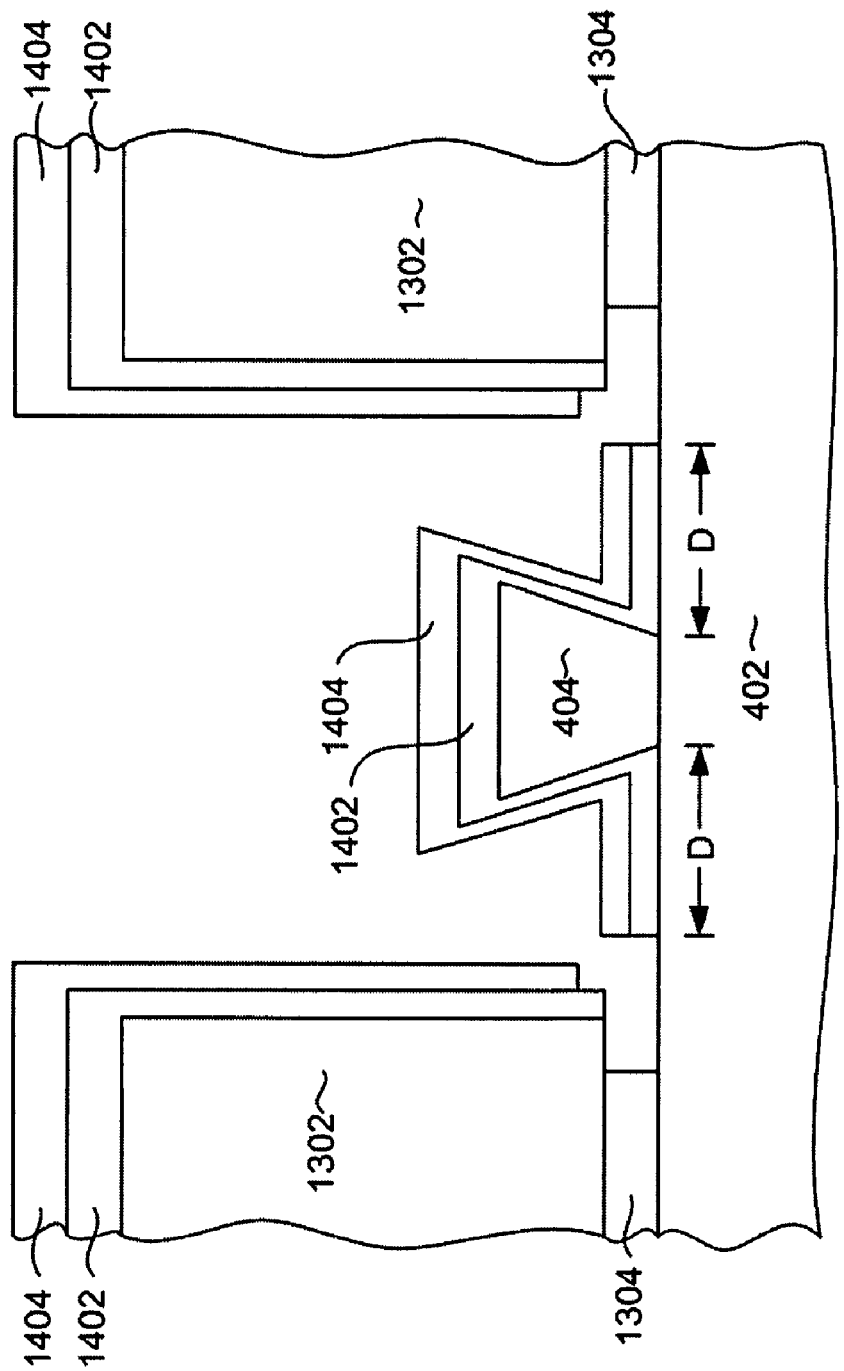

With reference now to FIG. 14, a layer of magnetic material such as CoFe 1402 is deposited followed by a non-magnetic spacer layer 1404. The magnetic layer 1402 provides a secondary flare point that is self aligned with an electrical lapping guide as will become clearer below. The non-magnetic spacer layer can be constructed of, for example Ta, Ta—O, Ni—Cr, Ru, Ir, Rh, etc. During deposition of the layers 1402, 1404, shadowing from the mask layer 1302 causes the layers 1402, 1404 to be deposited thicker at the top (i.e. leading edge) of the write pole 404 than at the sides. Also, the layers 1402, 1404 can extend across the substrate 402 a distance (D) of less than 0.4 um.

Figure 15:
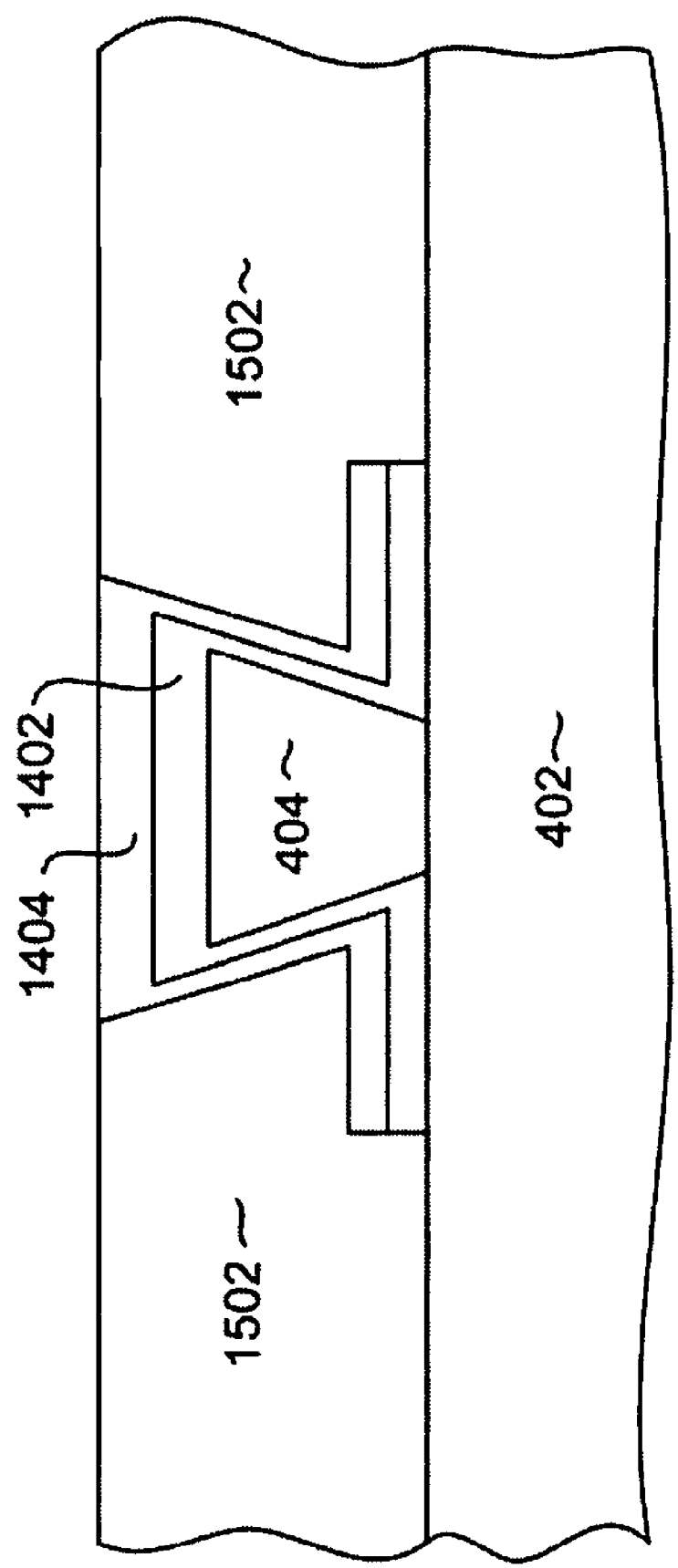
Figure 16:
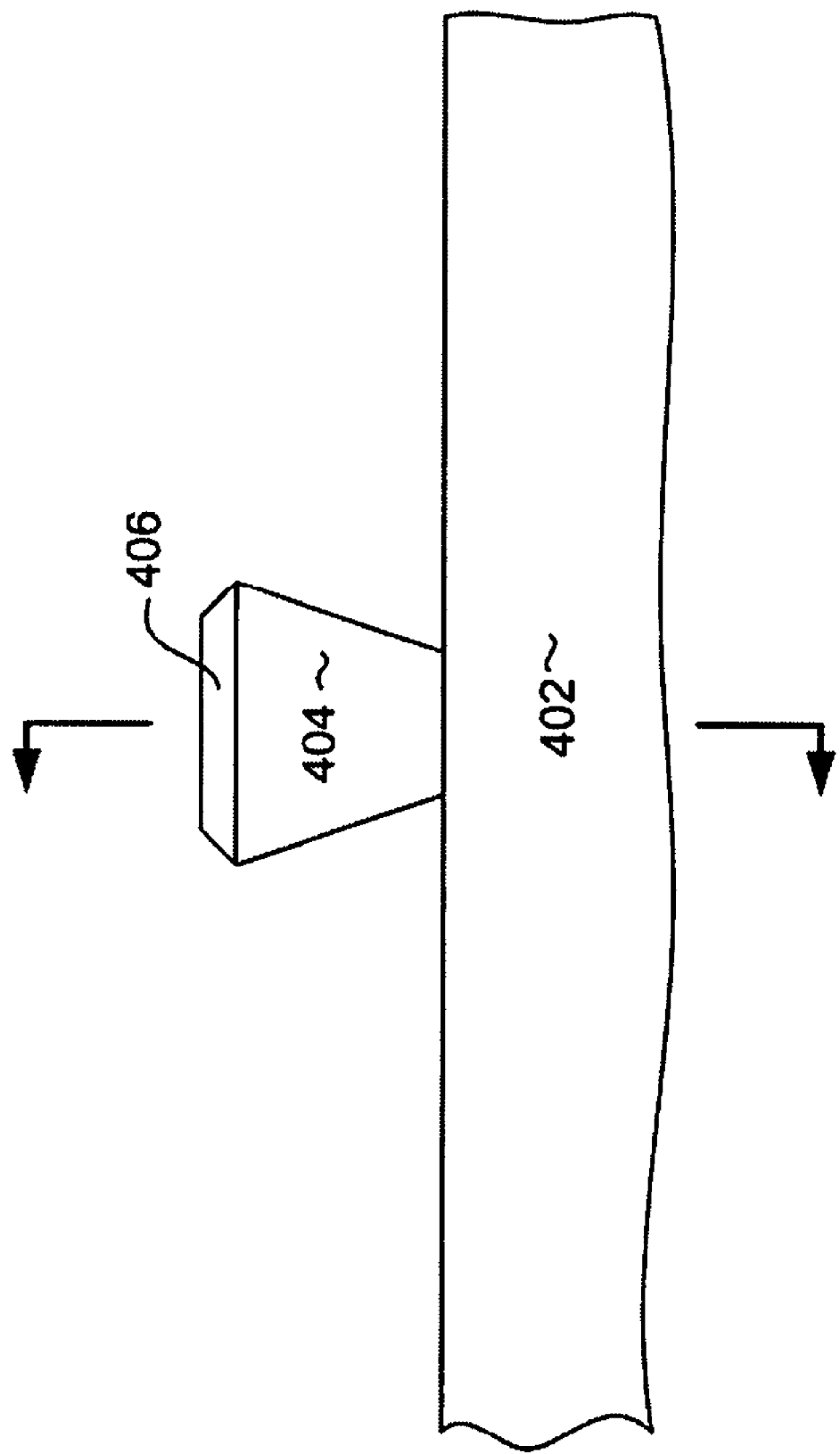

Then, the mask 1302 is lifted off. The previously formed mask 1202 (FIG. 12) can also be lifted off. A non-magnetic RIEable fill material 1502 such as $SiO_2$ is then deposited, and a chemical mechanical polishing process is performed to planarize the $SiO_2$ resulting in a structure as shown in FIG. 15. Then, a reactive ion etch is performed to remove the $SiO_2$ fill layer 1502, and also to remove the remaining DLC mask layer (second mask layer 408 in FIG. 7) from the pole tip area that was previously protected by the mask 1202 (FIG. 12). This results in a write pole 404 in the pole tip region as shown in FIG. 16, with only the first mask layer 406 remaining over the pole 404. It should be understood that FIG. 16, shows the pole tip region that was previously covered by mask 1202 (FIG. 12), whereas FIG. 15 shows the region that was not covered by the mask 1202, where the magnetic layer 1402 and non-magnetic shell 1404 have been deposited.

Figure 17:
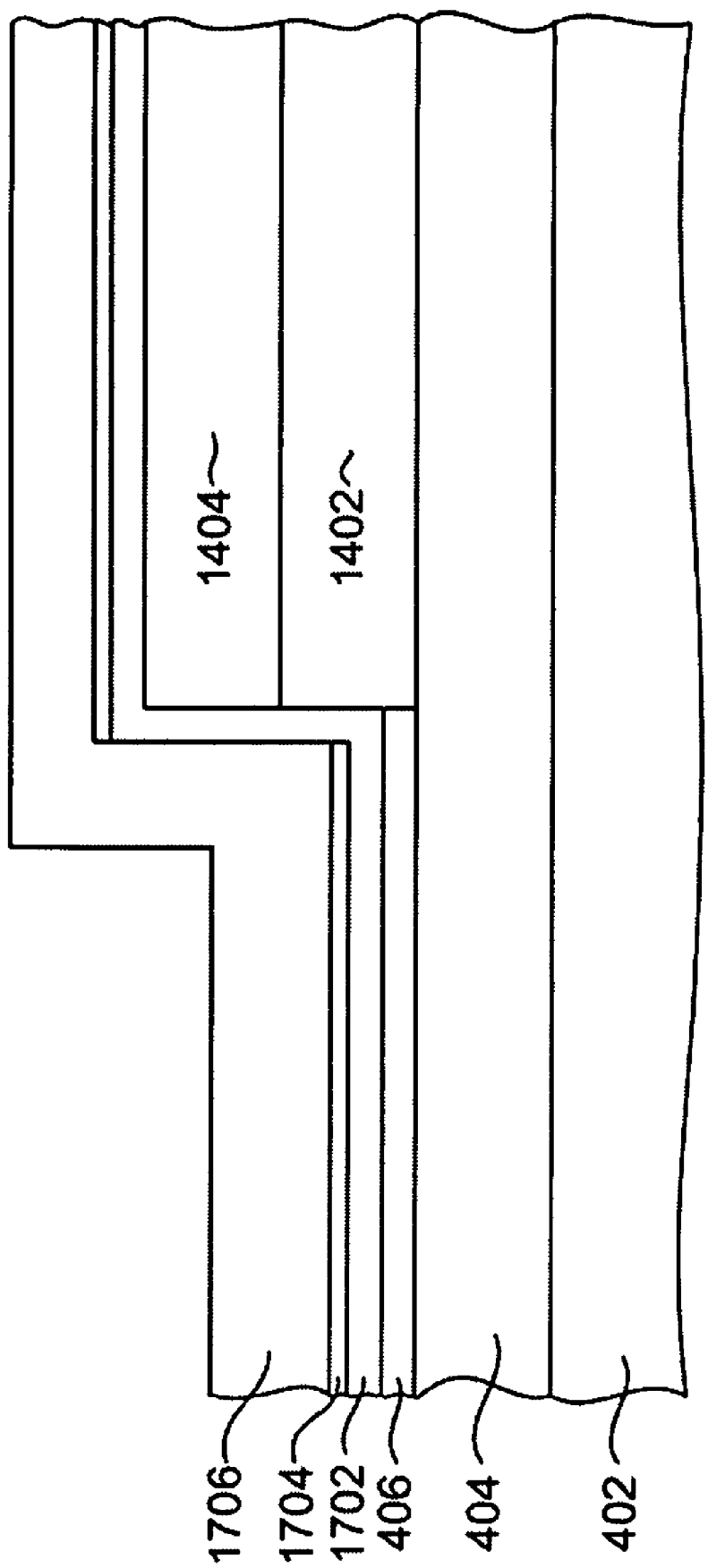

FIG. 17 shows a side view, as taken from 17-17 of FIG. 16. With reference then to FIG. 17, a first layer of non-magnetic material 1702 is deposited. The layer 1702 can be deposited by atomic layer deposition (ALD) and will be referred to herein as a first ALD layer 1702. The first ALD layer 1702 can be deposited to a thickness of, for example, about 5 nm. An end point detection layer 1704 is then deposited. The end point detection layer 1704 is preferably constructed of a material that can be readily detected by a process such as Secondary Ion Mass Spectroscopy (SIMS), and can be about 5 nm thick. Thereafter, a second ALD layer 1706 is deposited, which can be, for example, about 70 nm thick. The placement of the end point detection layer allows the thickness of the trailing shield gap to be controlled independently of the spacing between the trailing shield gap and the secondary flare point, as will become clearer below.

Figure 18:
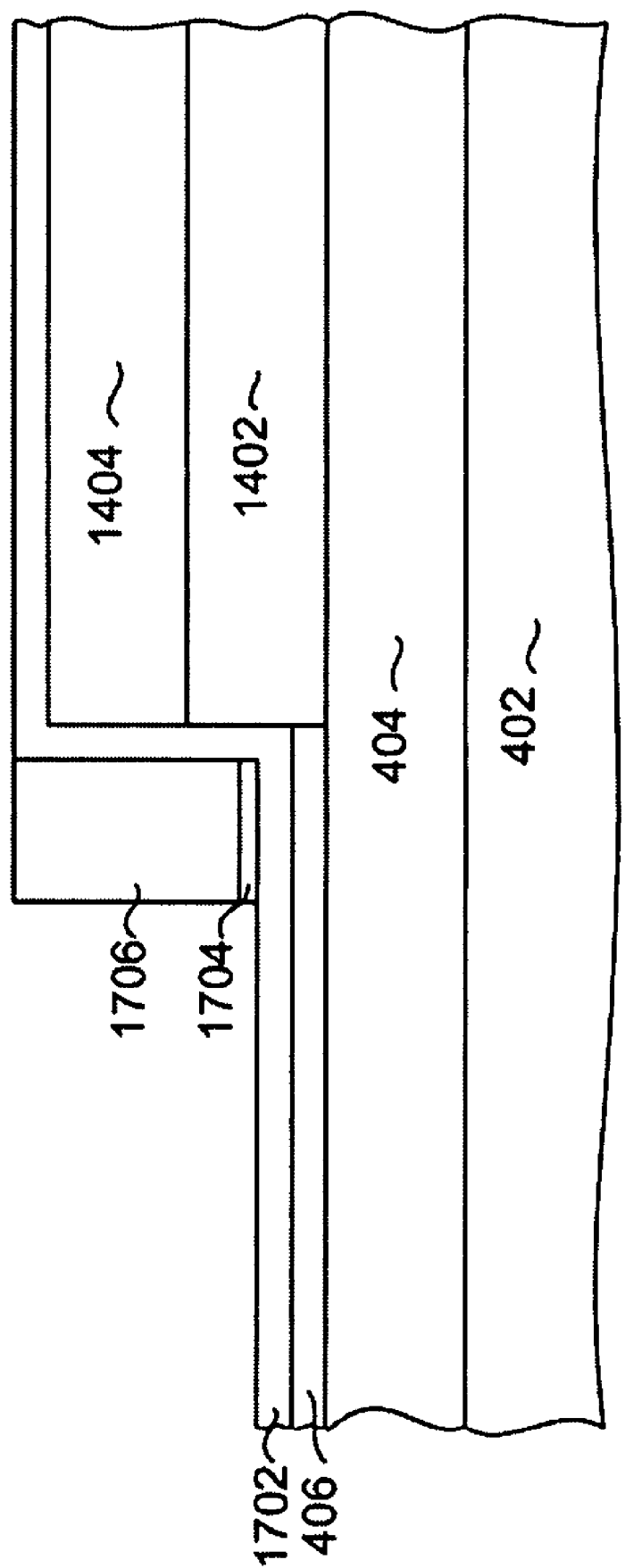

With reference now to FIG. 18, an ion milling is performed to remove ALD material 1706, and is terminated when the end point detection layer 1704 has been reached. The ion milling removes horizontally disposed material faster than vertically disposed material and, therefore, leaves vertical side walls such as the wall of ALD material 1706 shown in FIG. 18. ALD material will also be left on the sides of the write pole 404, although this can not be seen in FIG. 18, as the sides are into and out of the plane of the page in FIG. 18. Therefore, in this manner, the ion milling, with end point detection, allows a relatively thin trailing shield gap, and relatively thicker side shield gaps to be formed. For example, the trailing shield gap could be 35 nm (including the thickness of the mask layer 406 and first ALD layer 1702) and the side gap could be about 90 nm (including the thickness of the first and second ALD layers 1702, 1706). Again, the side gap can not be seen in FIG. 18.

Figure 19:
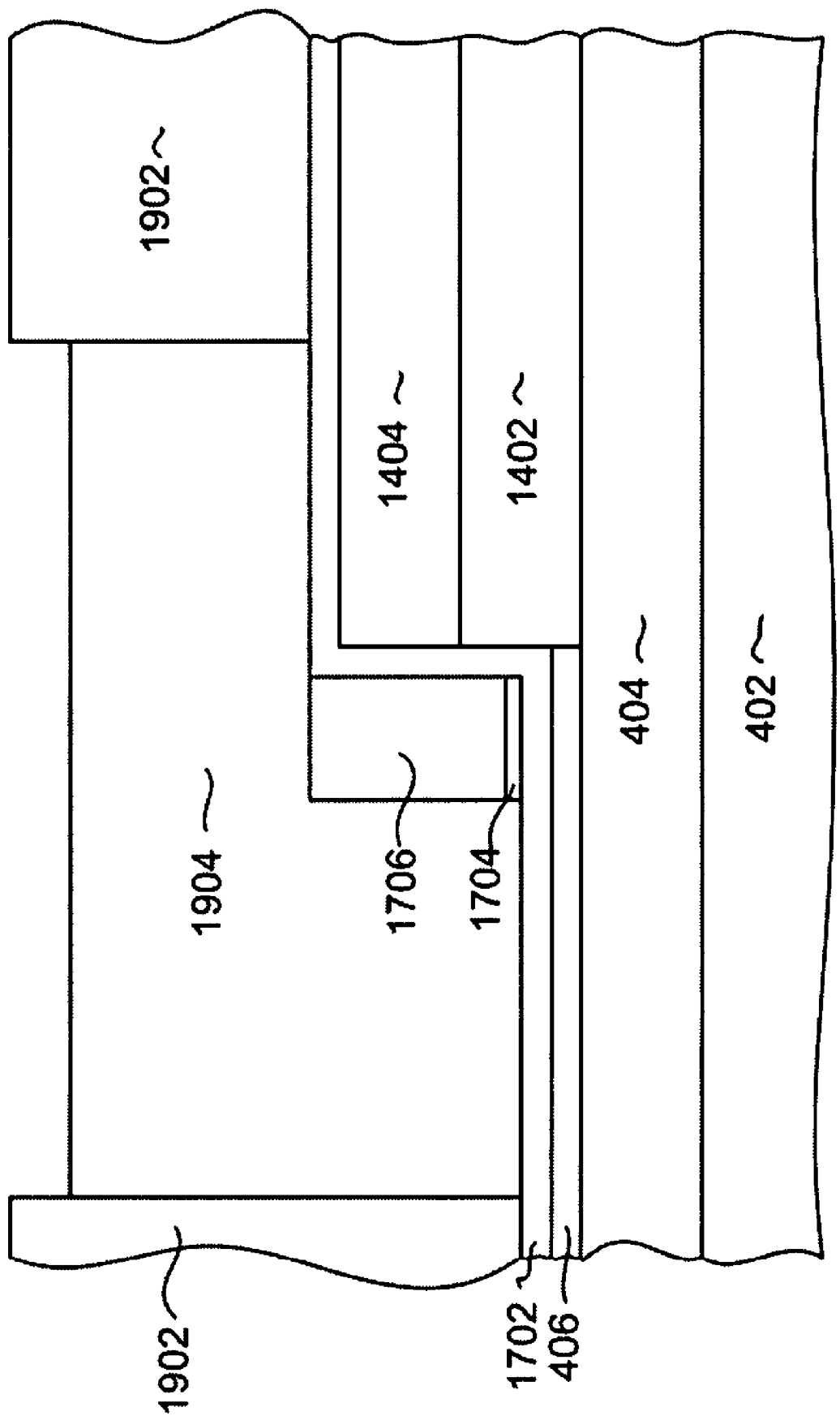
Figure 20:
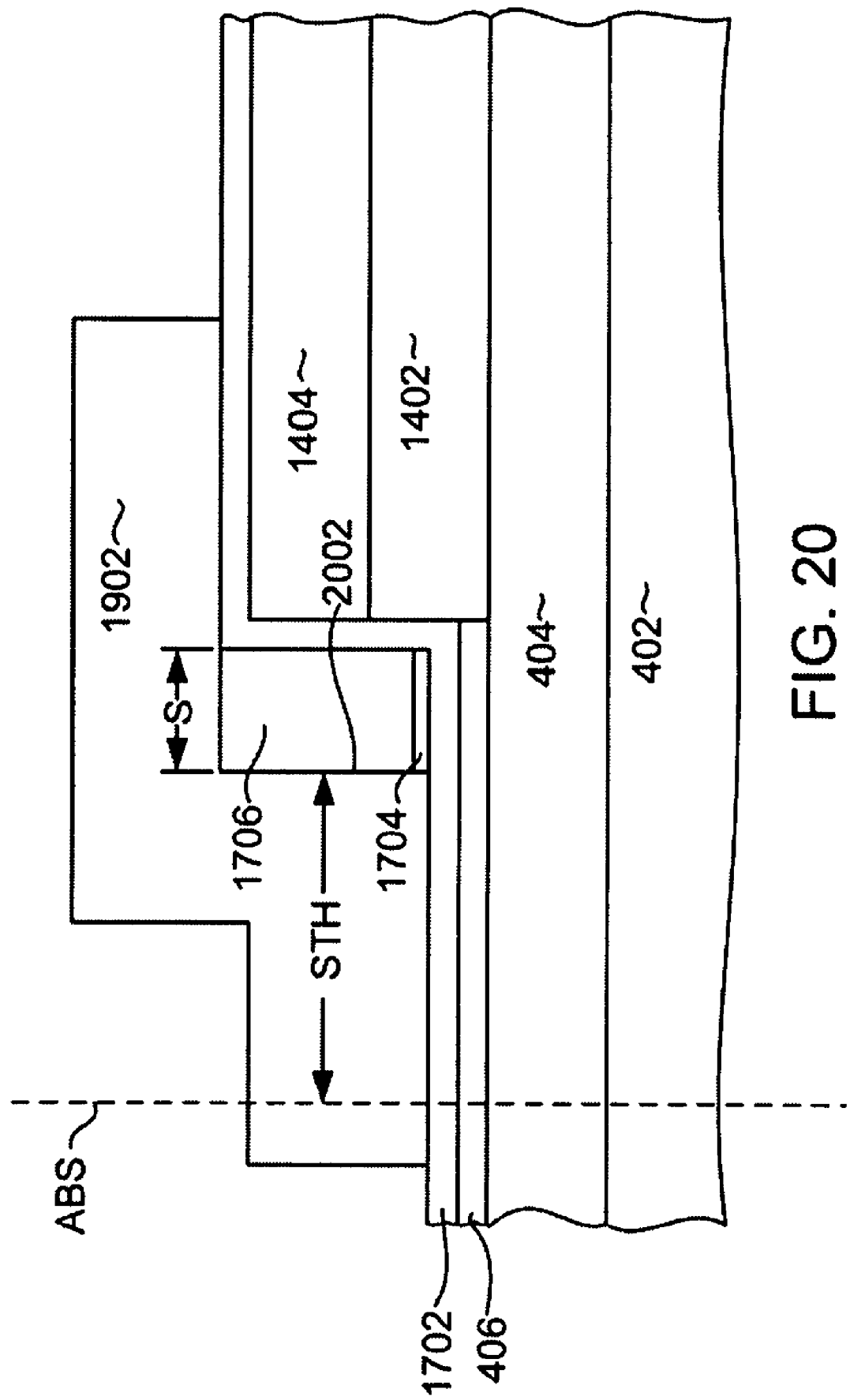

With reference now to FIG. 19, a trailing shield mask structure 1902 is formed, and a magnetic material such as Co—Fe or Ni—Fe can be electrically plated into the opening in the mask 1902 to form a trailing magnetic shield. Then, the mask 1902 is lifted off, leaving a structure as shown in FIG. 20. As can be seen in FIG. 19, the ALD layers 1702, 1706 provide a desired spacing between the shield 1904 and the magnetic secondary flare structure 1402. This prevents magnetic flux from leaking from the magnetic secondary flare structure 1402 to the magnetic shield 1904. The magnetic layers 1702, 1706 could provide a spacing (S) of about 30 nm between the magnetic spacer layer 1402 and the trailing shield 1904, and could define a shield throat height (STH) of about 55 nm, as measured from the air bearing surface ABS to the back edge 2002 of the trailing shield 1904.

The above described method provides a self aligned wrap around magnetic pole 1402 that is stitched to the main pole 404, and provides a secondary flare point (at the front edge 2004 of the stitched pole 1402) that can is self aligned and can be easily controlled. The above described process also provides a trailing wrap around shield 1904 that has an easily defined, self aligned throat height STH.

Figure 21:
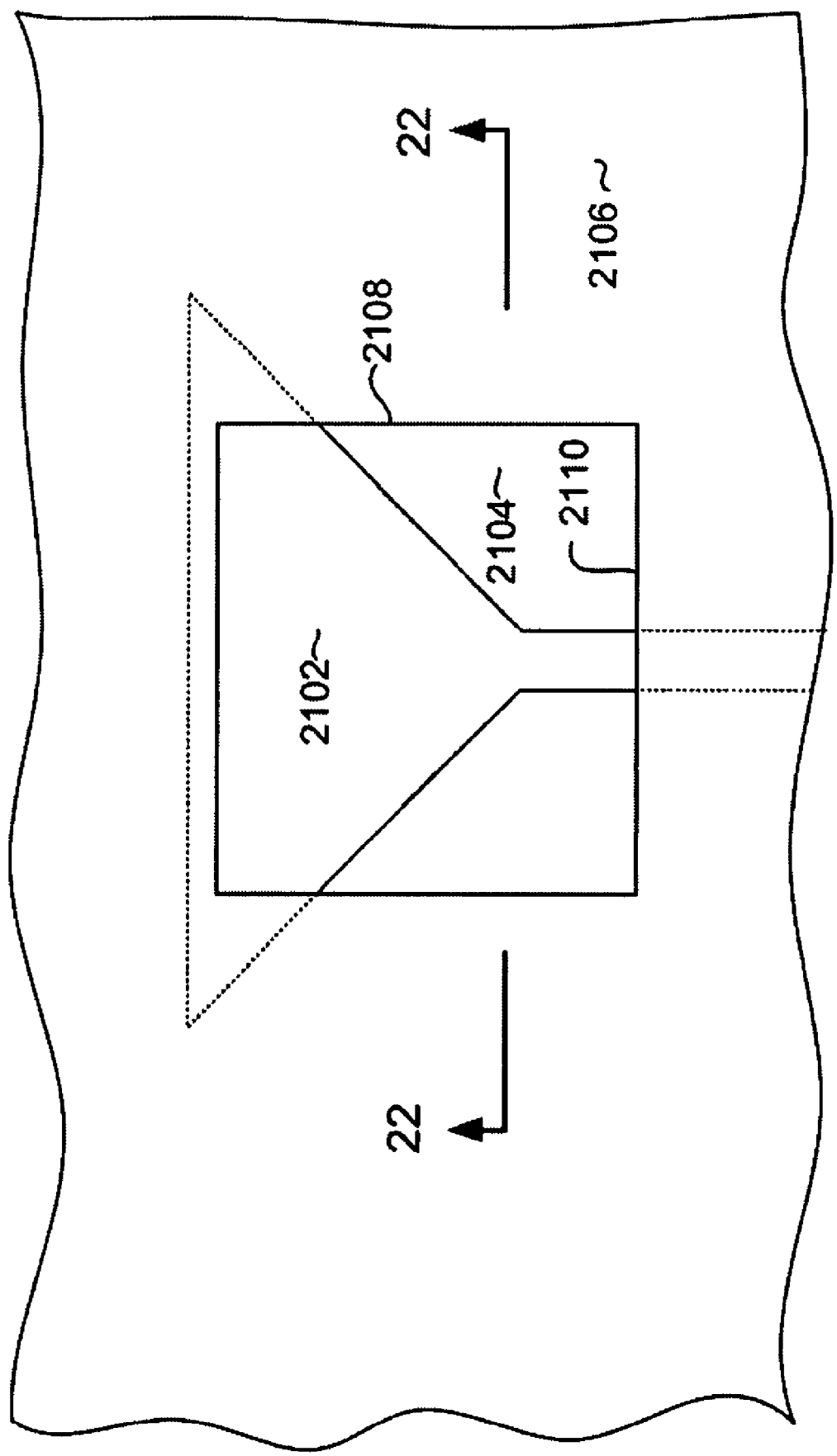
FIGS. 21-23 are illustrations of a write head in various intermediate stages of manufacture illustrating a method of manufacturing a magnetic write head according to an alternate embodiment of the invention.
Figure 22:
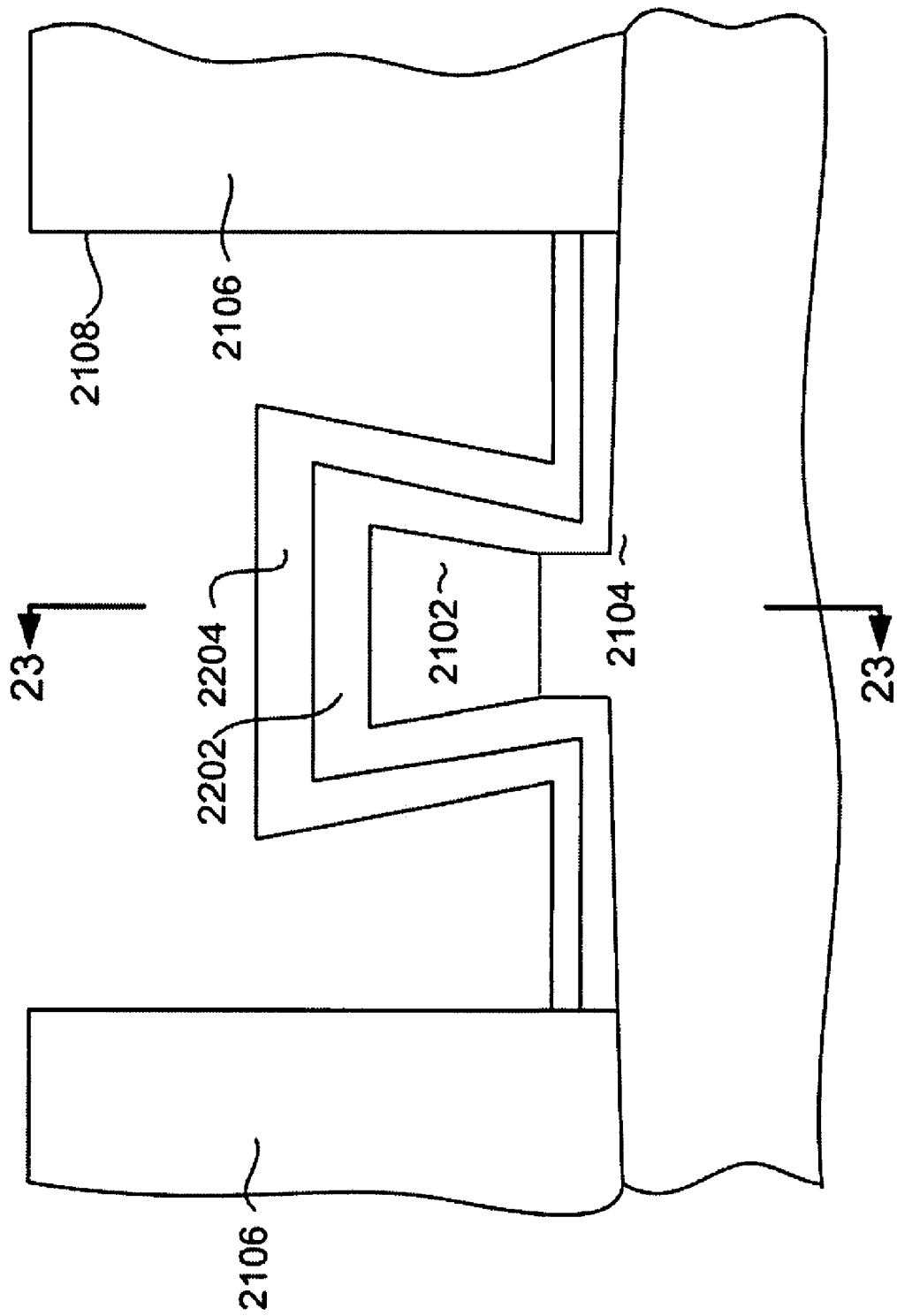
Figure 23:
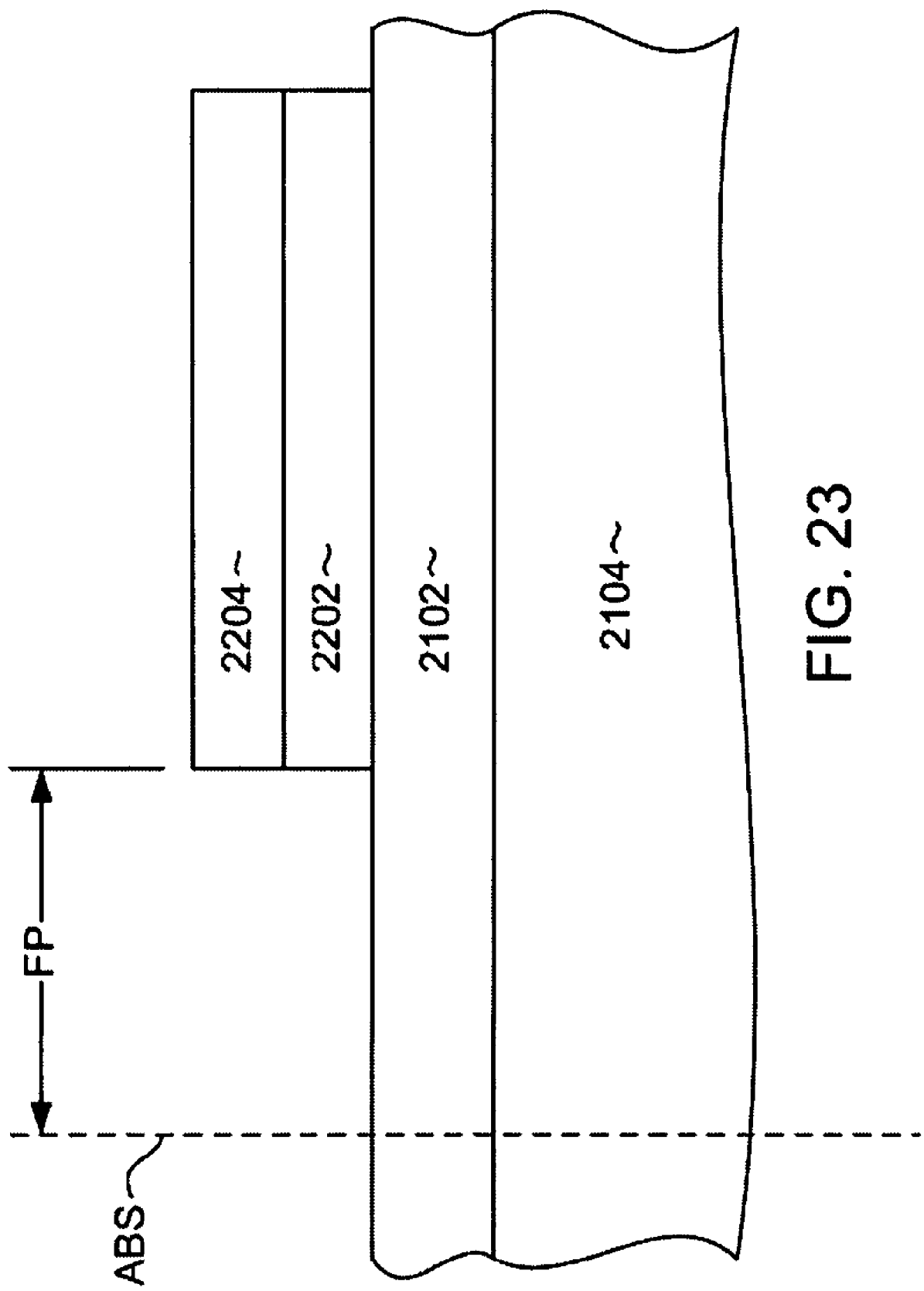

Short Flare Definition by Additive Process:

With reference now to FIGS. 21-23, a method for constructing a perpendicular magnetic write head according to another embodiment of the invention is described. With particular reference to FIG. 21, a previously constructed write pole 2102 formed on a substrate 2104 is shown in a top down view. A bi-layer mask structure 2106 is formed over the write pole 2102 and substrate 2104. The mask 2106 has an opening 2108 with a front edge 2110 located at a desired secondary flare point location. In FIG. 21, portions of the write pole 2102 that are hidden beneath the mask 2106 are shown in dotted line, whereas portions of the write pole 2102 that are exposed through the opening 2108 are shown as solid lines.

With reference to FIG. 22, a layer of magnetic material 2202 such as Ni—Fe or Co—Fe is deposited into the opening 2108 in the mask 2106. This magnetic material 2202 forms a stitched magnetic pole that has a front edge located at and defined by the front edge 2110 (FIG. 21) of the mask opening 2108. This front edge of the stitched pole 2202 forms a secondary flare point that can be easily controlled relative to a yet-to-be-defined air bearing surface (ABS). After depositing the magnetic stitched pole layer 2202, a layer of non-magnetic material is deposited into the trench to form a non-magnetic spacer 2204. After deposition of the layers 2202, 2204, the mask structure 2106 can be lifted off.

FIG. 23 shows a side view of the write head structure. In FIG. 23 it can be seen that the stitched pole 2202 has a front edge 2302 that is defines a secondary flare point located a desired distance (FV) from the intended air bearing surface location (ABS).

Figure 24:
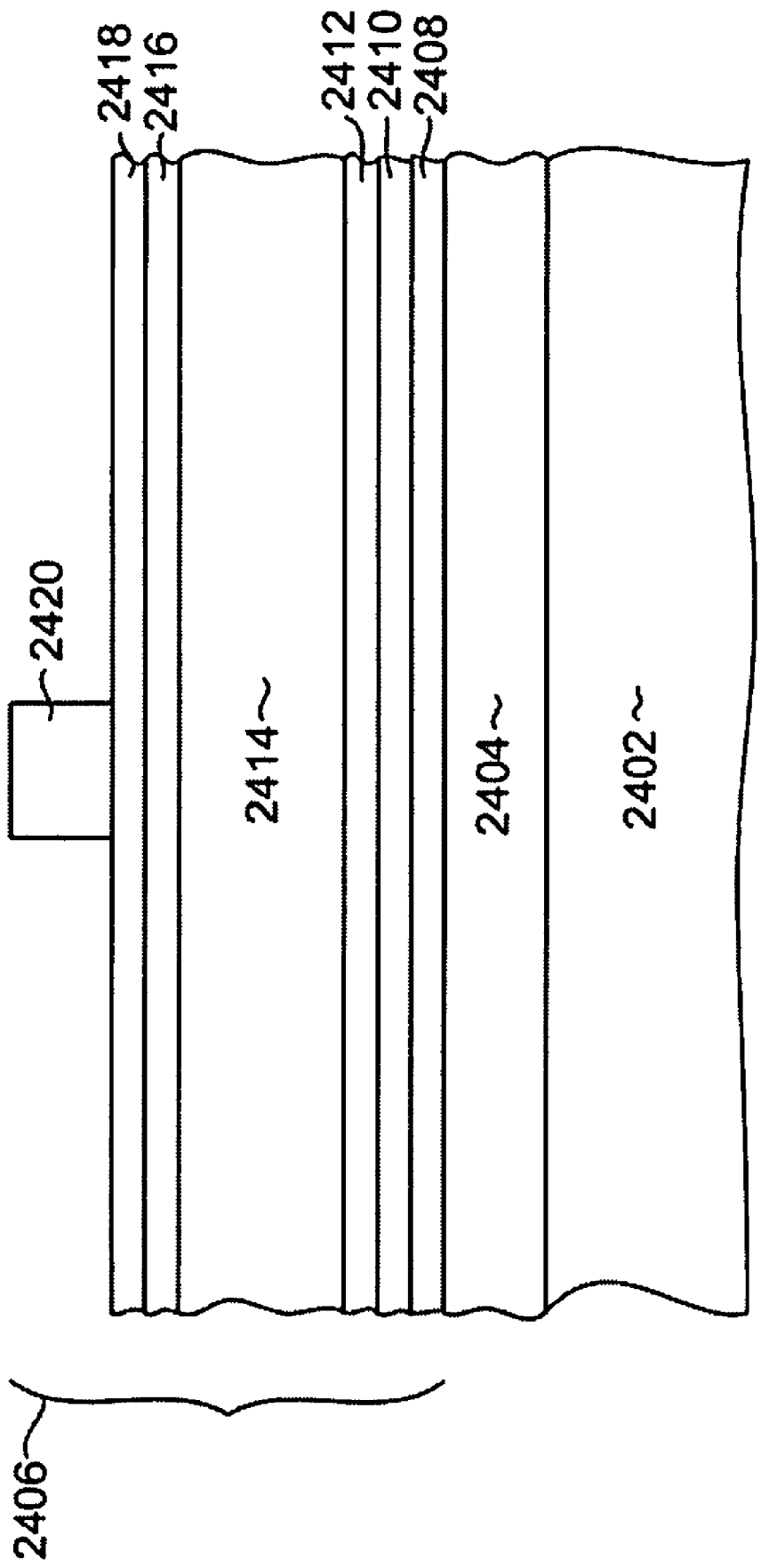
FIGS. 24-36 are illustrations of a write head in various intermediate stages of manufacture illustrating a method of manufacturing a magnetic write head according to yet another embodiment of the invention.

Magnetic Deposition Defined Draping Stitched Flare for Self Aligned Perpendicular Writer:

FIGS. 24-36 illustrate a method of manufacturing a perpendicular magnetic write head according to yet another embodiment of the invention. With particular reference to FIG. 24, a substrate 2402 is provided. A magnetic main write pole material 2404 is deposited over the substrate 2402. A series of mask layers 2406 is deposited over the write pole material 2404. The mask layers 2406 include a first hard mask layer 2408 preferably constructed of alumina (Al$_2$O$_3$) and having a thickness of about 20 nm formed over the write pole layer 2404. A second hard mask layer 2410, preferably constructed of Si—N and having a thickness of about 30 nm is deposited over the first hard mask layer 3408. A third hard mask layer 2412, preferably constructed of Al—Ti—O and having a thickness of about 20 nm is deposited over the second hard mask layer 2410.

An image transfer layer 2414 is deposited over the first second and third hard mask layers. The image transfer layer can be constructed of a polyimide material such as DURIMIDE®, and can have a thickness of about 1300 nm. The mask structure 2406 can also include a layer of SiO$_2$ 2416 formed over the image transfer layer 2414 and a second layer of a material such as DURIMIDE 2418 formed over the layer 2416. A layer of photoresist material 2420 is formed at the top of the mask structure and is photolithographically patterned to define a desired main pole shape.

Figure 25:
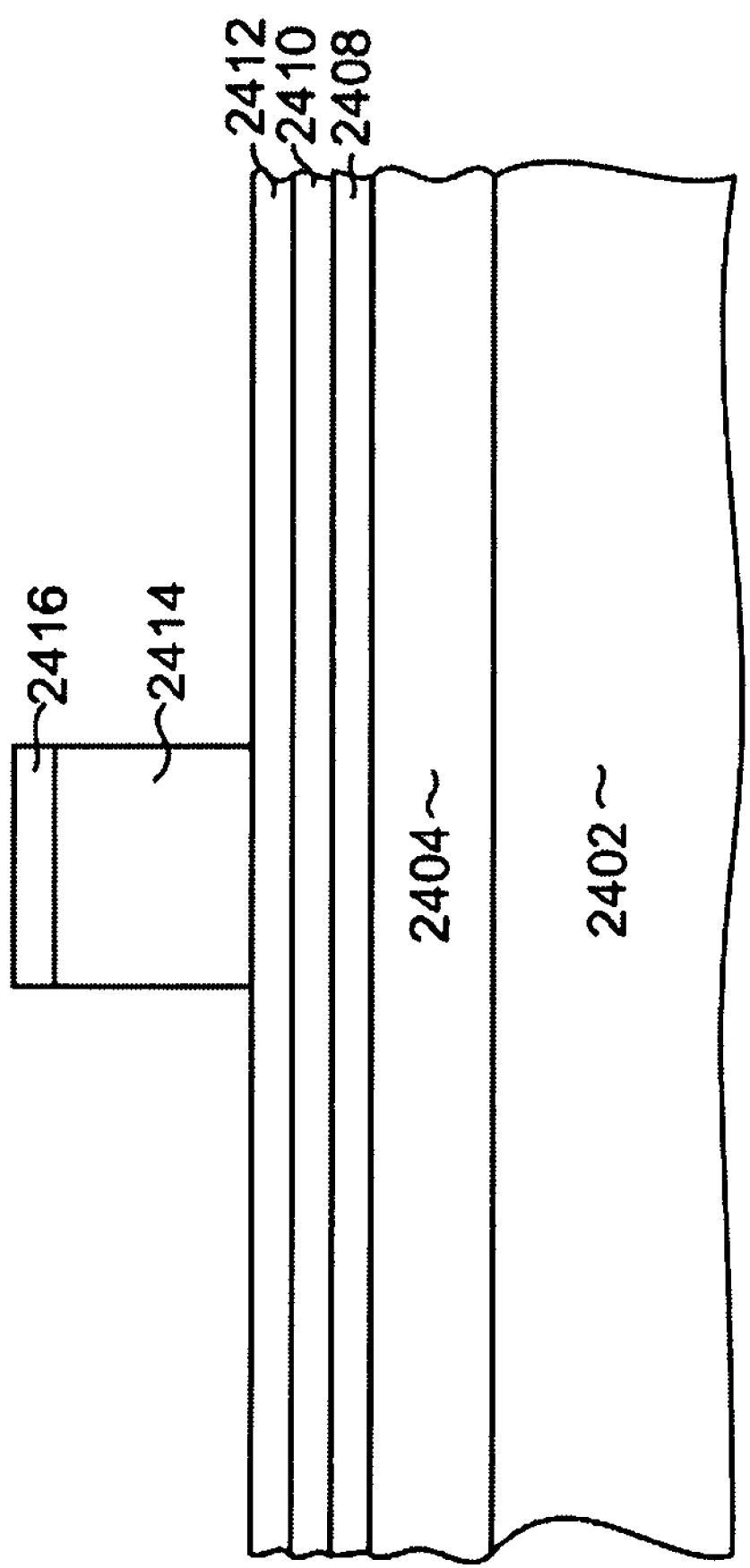

A three part reactive ion etching process (RIE) is performed to transfer the image of the photoresist layer 2420 onto the underlying layers 2418, 2414, 2416. Some or all of the layers 2418, 2420 can be removed by this three part RIE process, resulting in a structure as shown in FIG. 25.

Figure 26:
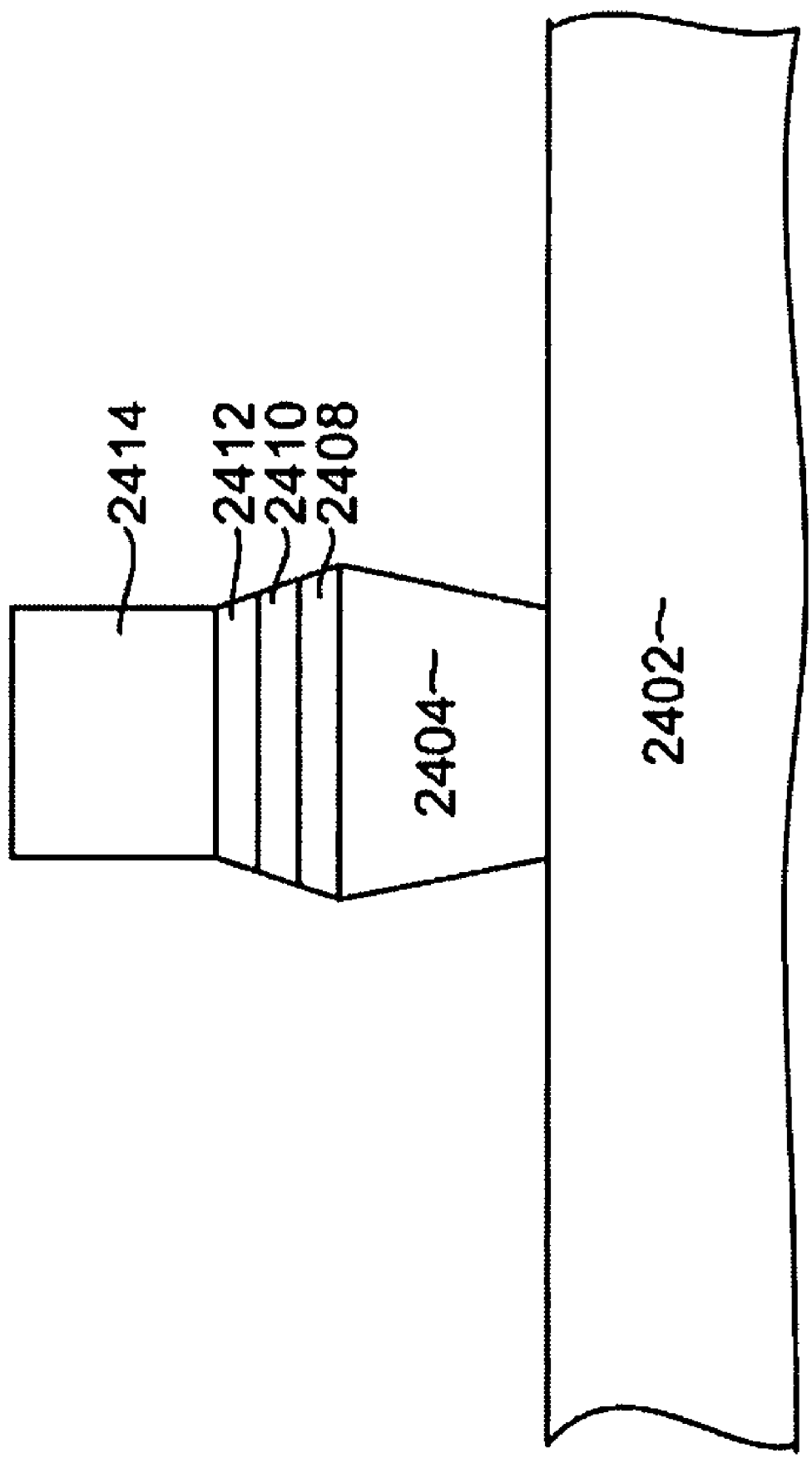
Figure 27:
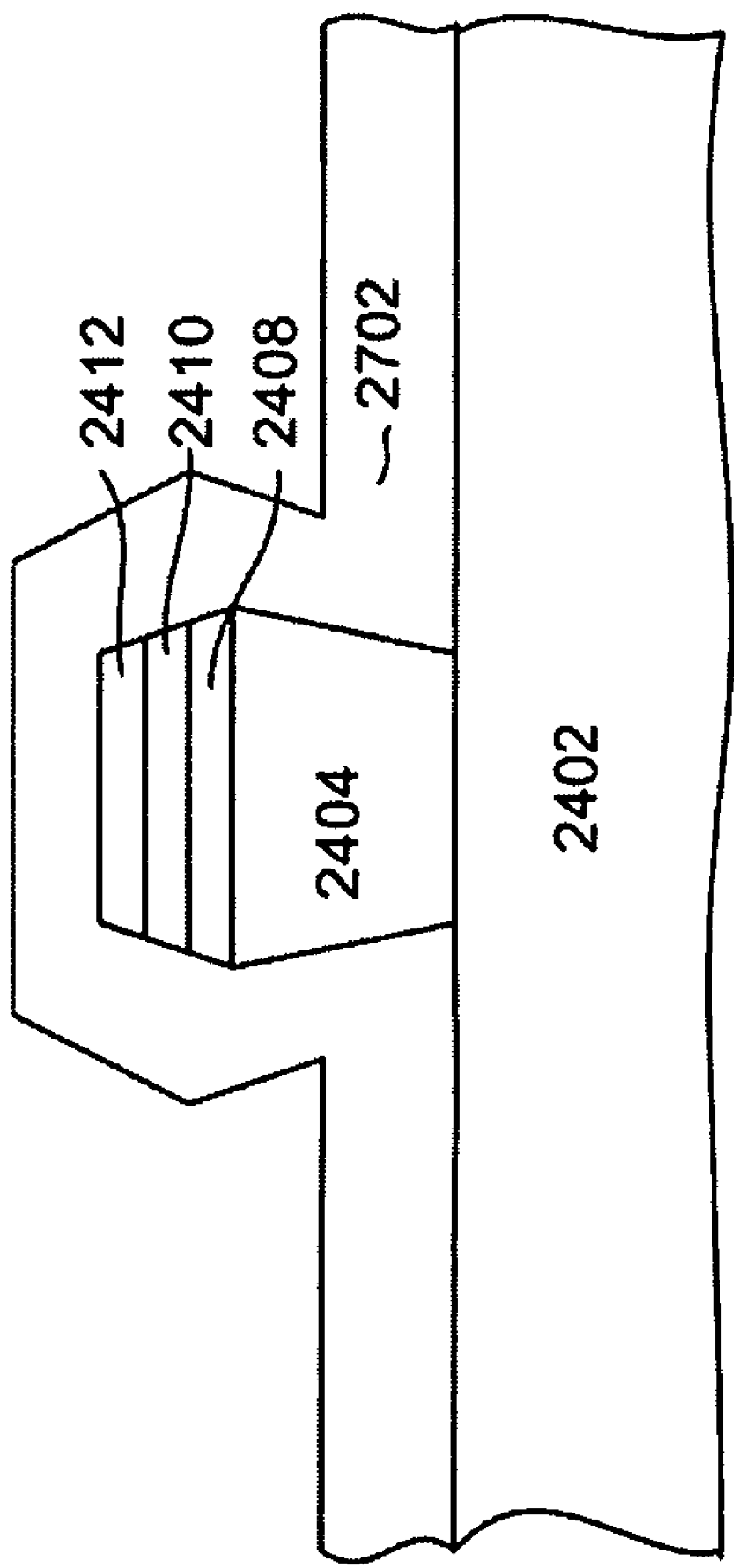

A multi-angle ion milling is then performed, resulting in the structure as shown in FIG. 26 with a trapezoidal, tapered write pole 2404. A TMAH etch and NMP strip can then be performed to remove any remaining image transfer layer 2414. With reference to FIG. 27, a layer of alumina is deposited by a conformal deposition process such as atomic layer deposition (ALD) and will be referred to herein as ALD layer 2702. The ALD layer 2702 can be deposited to a thickness of about 40 nm.

Figure 28:
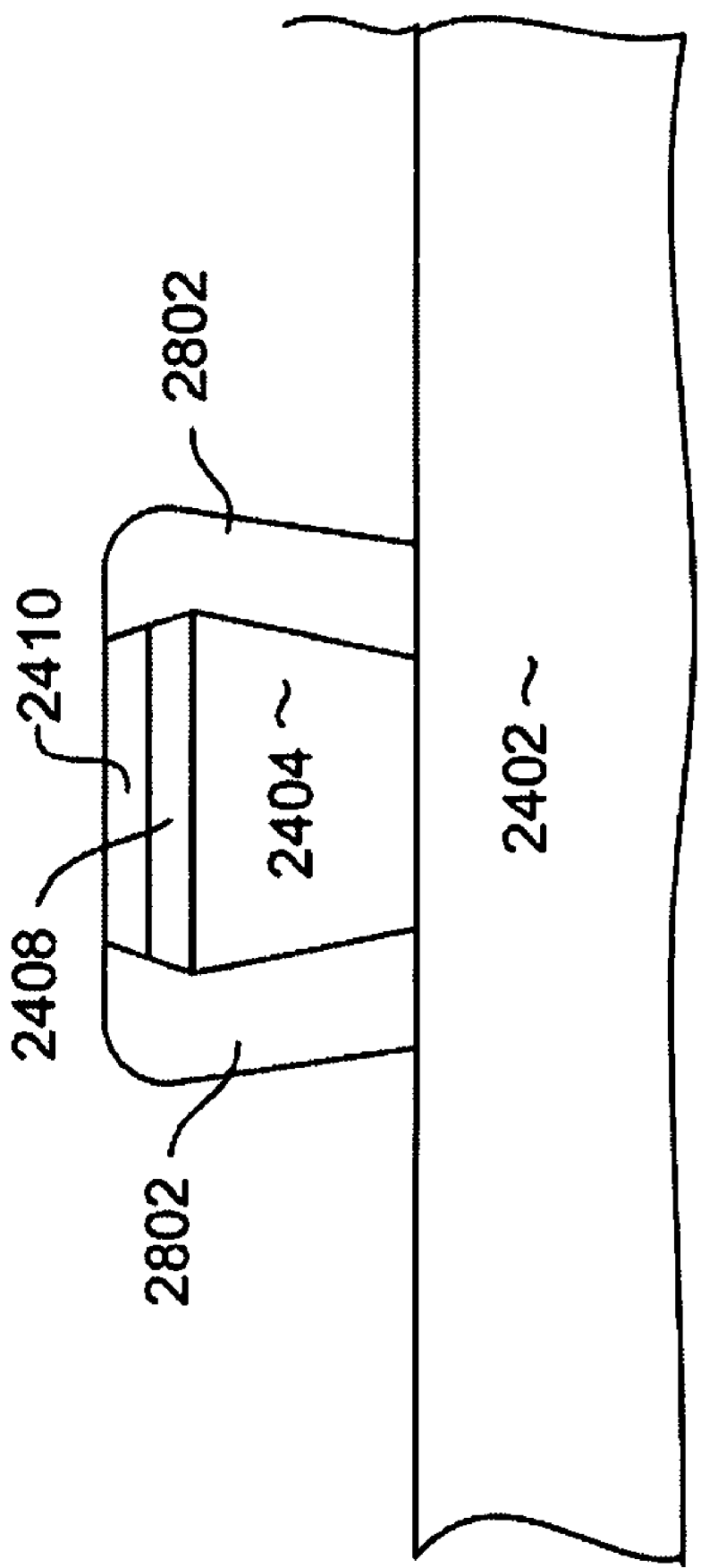

With reference now to FIG. 28, an ion milling is performed sufficiently to remove a top portion of the ALD layer 2702 and to remove the third hard mask 2412 (FIG. 27). The third hard mask layer 2412 can be used as an end point detection layer, by detecting the presence of Ti, such as by Secondary Ion Mass Spectroscopy (SIMS). In this way, a non-magnetic side gap 2802 having a thickness (SG) can be formed. The side gap SG can be, for example about 40 nm.

Figure 29:
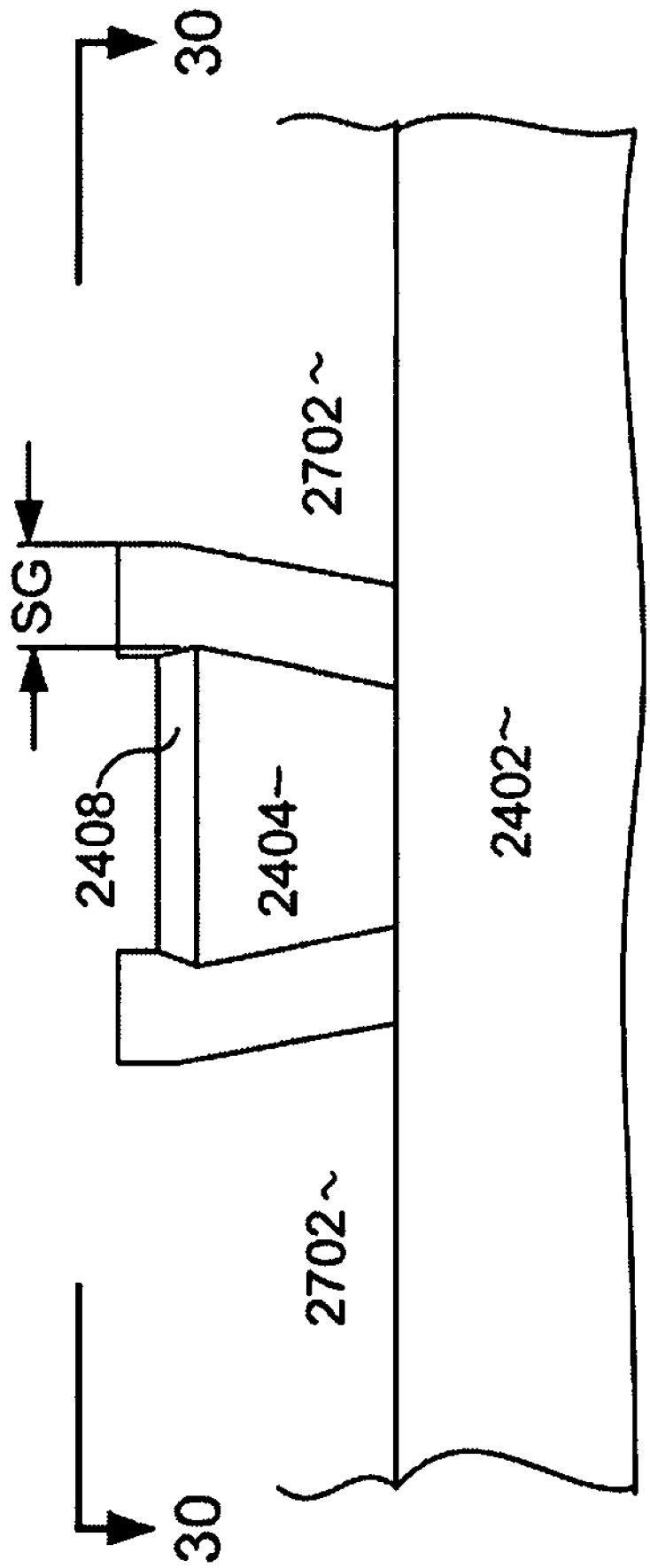

Then, a reactive ion etch (RIE) can be performed to remove the second hard mask layer 2410, resulting in a structure as shown in FIG. 29. The remaining first mask layer 2408 will be available to define a trailing shield gap as described further below.

Figure 30:
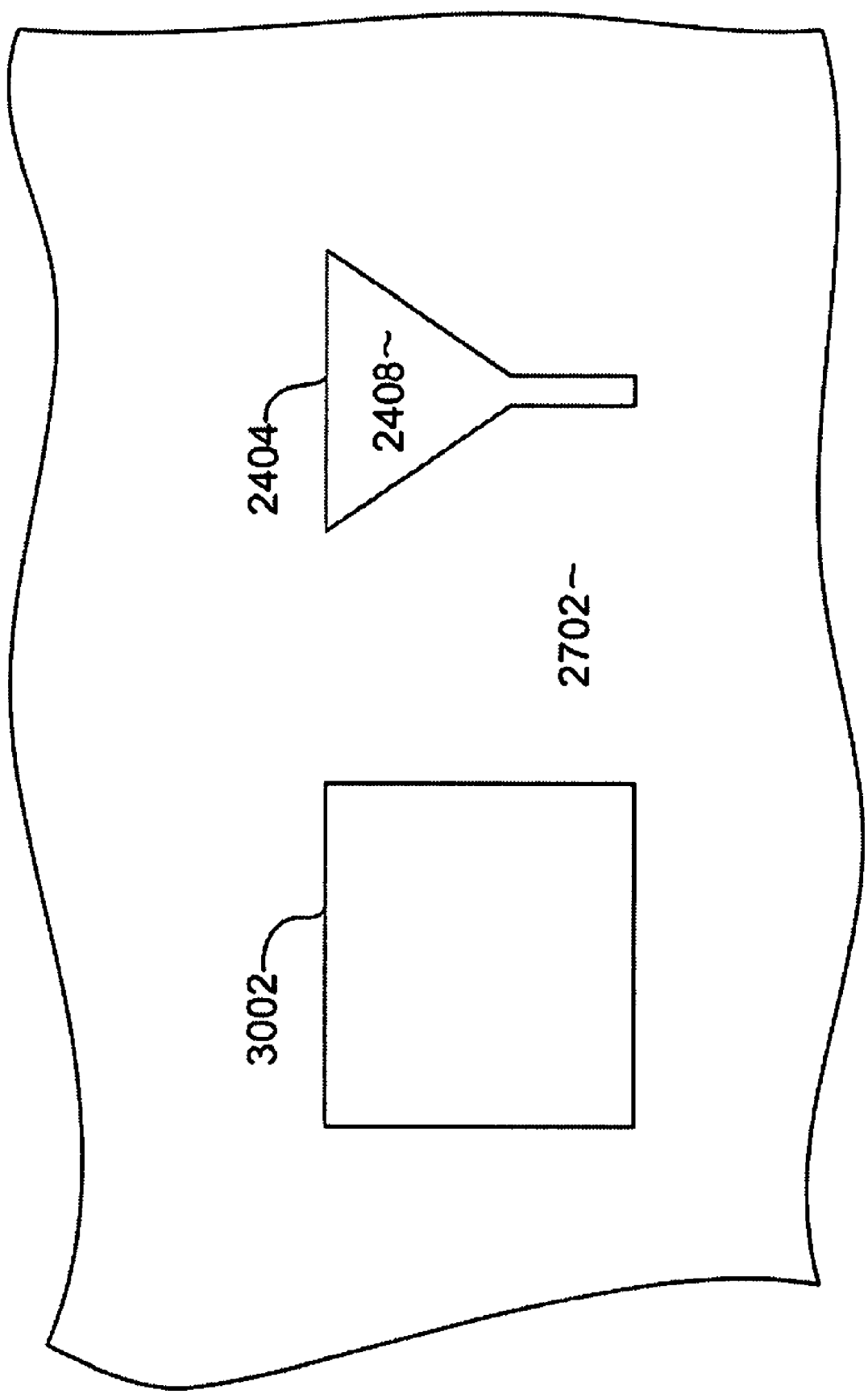

FIG. 30 is a top down view showing the capping layer 2408 overlying the write pole 2404 and showing an adjacent writer lapping guide area. A layer of electrically conductive electrical lapping guide material (ELG material) 3002 is formed in an area adjacent to the write pole 2404 and capping layer 2408. The ELG material 3002 can, for example Au, Ru, Ir, Rh, etc. and can be deposited by a liftoff process that leaves the material 3002 only in the desired ELG area.

Figure 31:
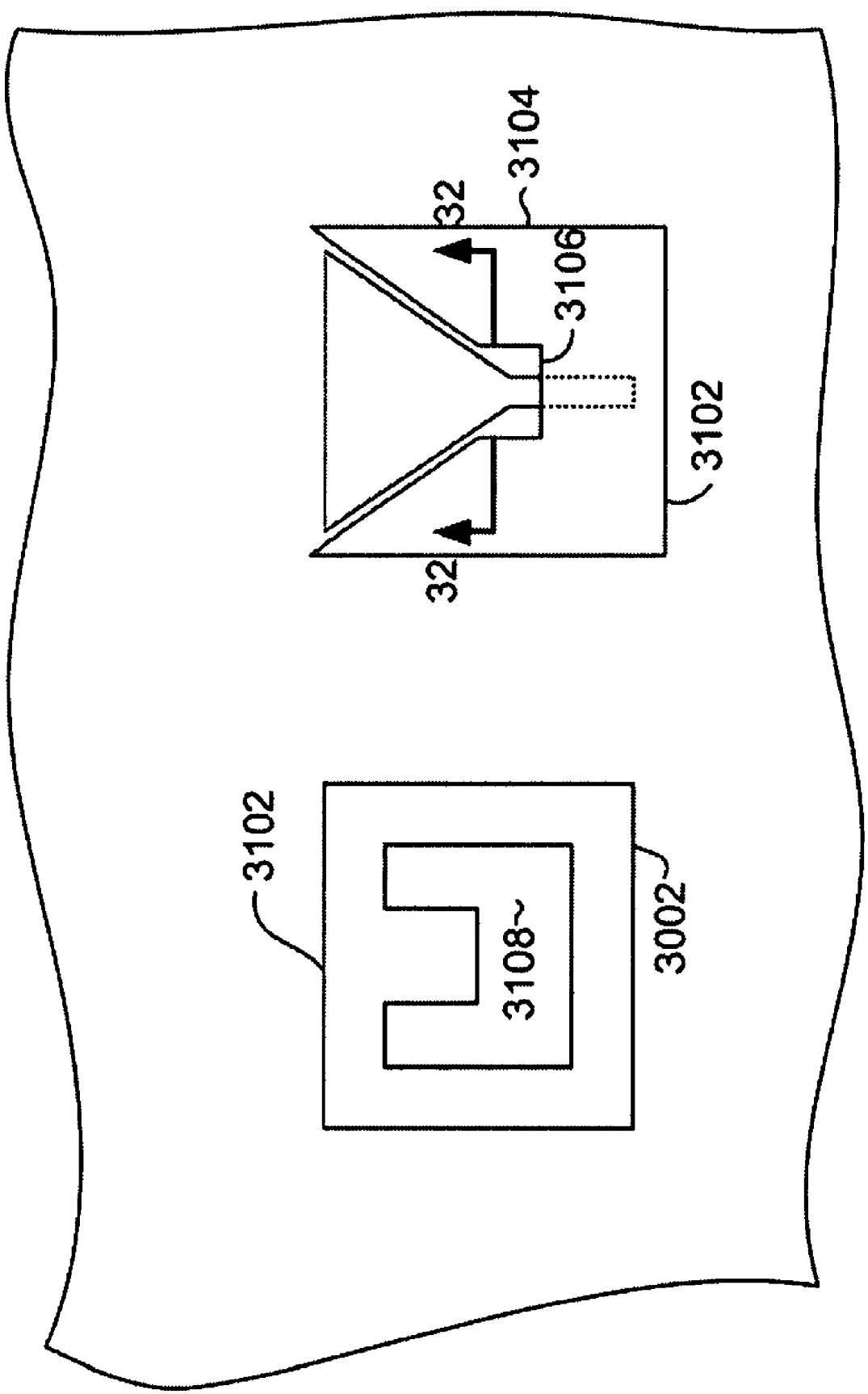

With reference now to FIG. 31, a mask 3102 is formed. The mask has a first portion 3104 that covers a throat portion of the write pole 2404 and hard mask 2408 as shown, leaving a back portion of the write pole 2404, 2408 uncovered. This first portion 3104 has an edge 3106 that will define the location of a secondary flare point, provided by a stitched pole, as will become clearer below. The portions of the mask 2404, and capping layer 2408 that are hidden beneath the mask 3102 are shown in dotted line.

Figure 32:
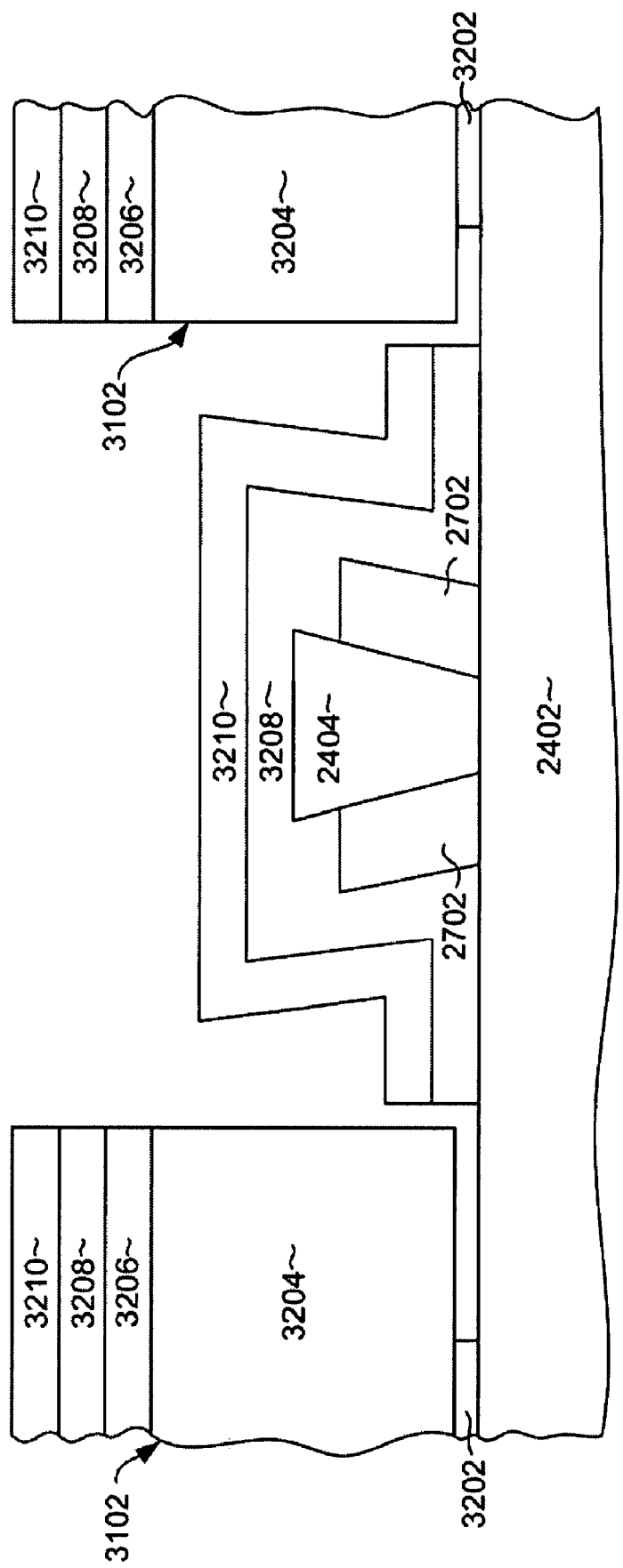

The mask 3102 also includes a second portion 3108 that covers a portion of the ELG material 3002 and that is configured to define an ELG. With reference to FIG. 32, the mask 3102 can be formed by first depositing a layer of Si—N, SiO$_2$ or PMGI as a mask liftoff material 3202, and depositing a layer of polyimide material 3204 such as DURIMIDE® thereover. A layer of photoresist 3206 can then be deposited and photolithographically patterned. A reactive ion etch (RIE) process can then be performed to transfer the image of the photoresist onto the underlying polyimide and liftoff layers.

Figure 33:
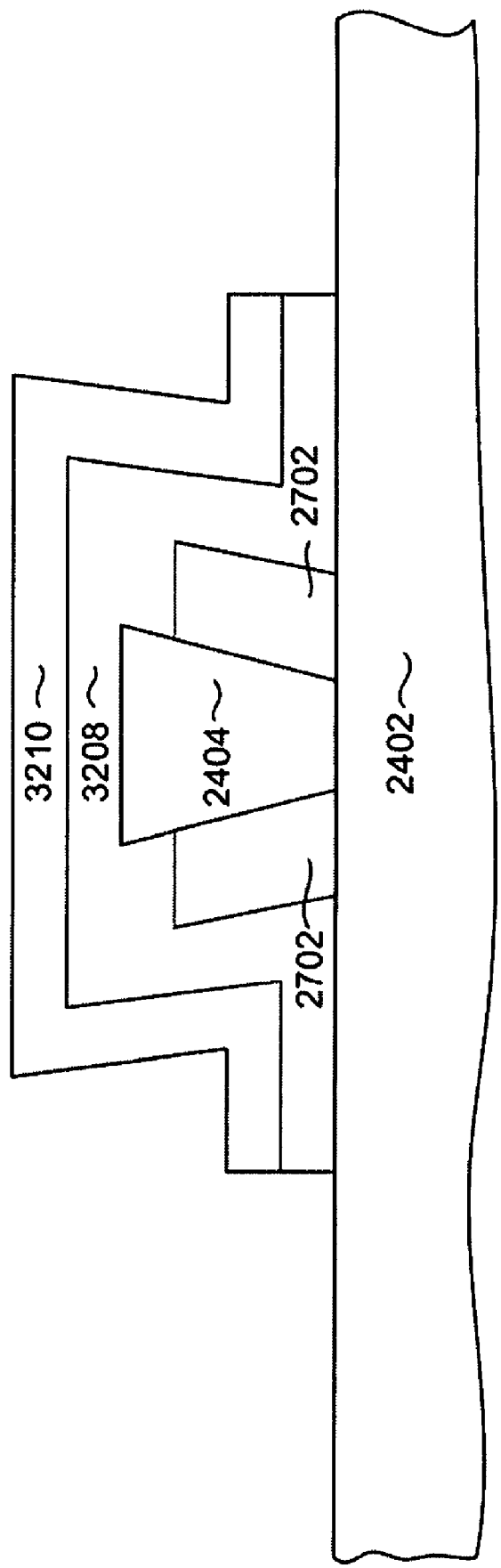

With the mask 3102 in place, a reactive ion milling (RIM) or reactive ion etching (RIE) can be performed to remove the hard mask 2408 and a portion of the ALD sidewalls 2702. Then, a layer of magnetic material 3208 can be deposited, followed by a layer of non-magnetic spacer material 3210. The remaining polyimide material 3204 can then be lifted off, and the remaining liftoff material 3202 (e.g. Si—N, $SiO_2$ or PMGI) can be removed by a RIE or a wet etch, depending on the liftoff material used, resulting in a structure as shown in FIG. 33.

Figure 34:
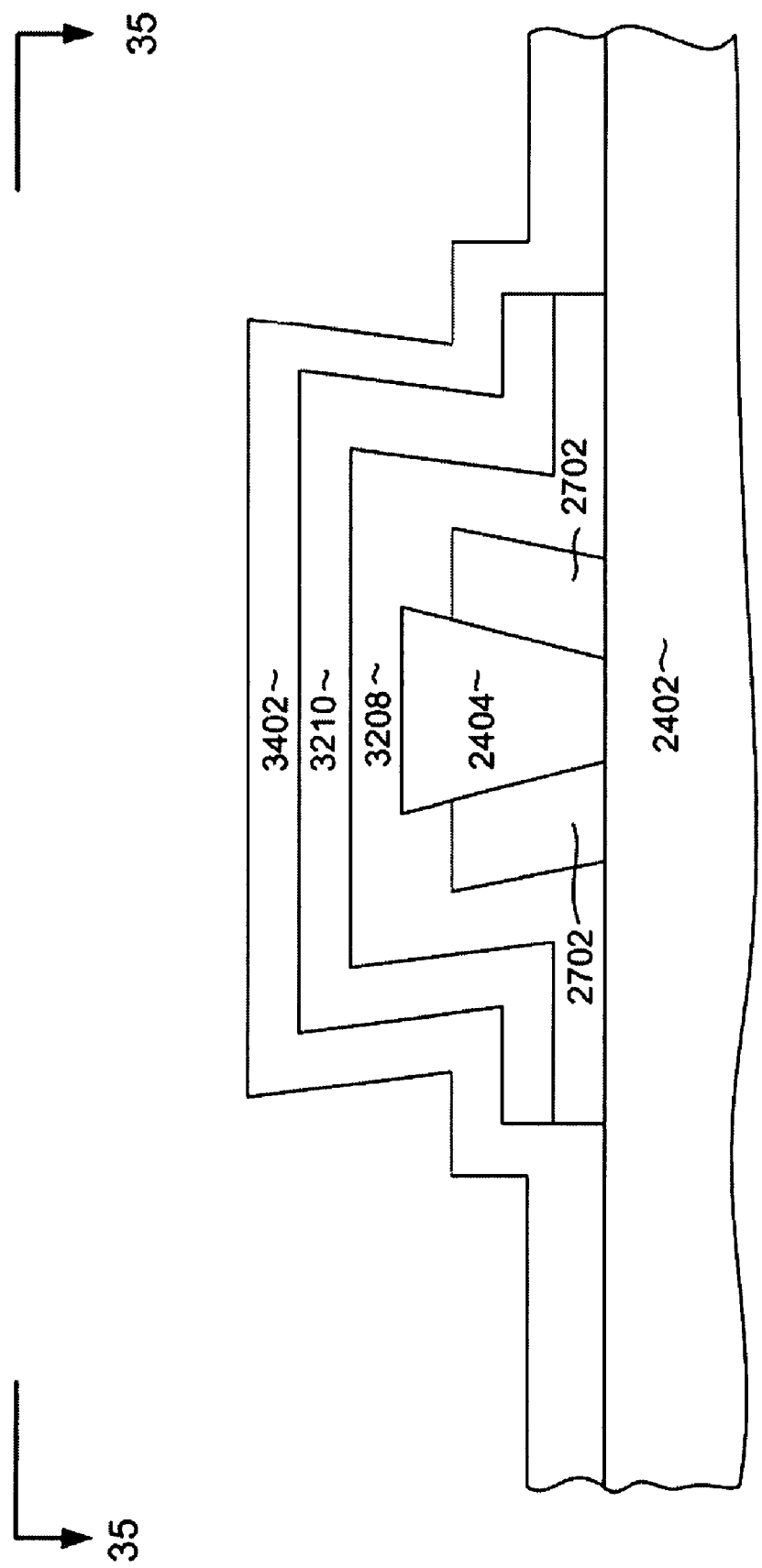
Figure 35:
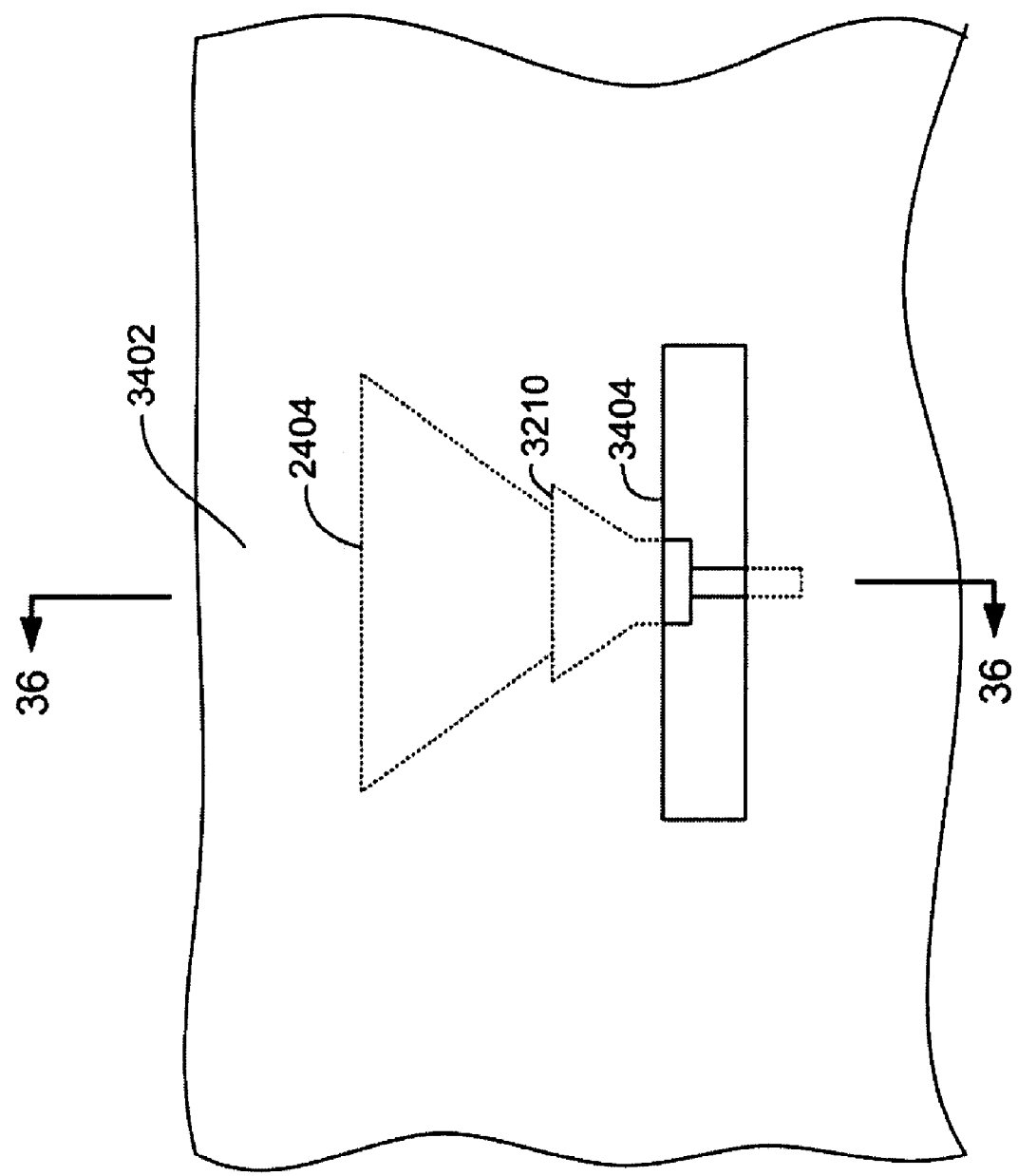
Figure 36:
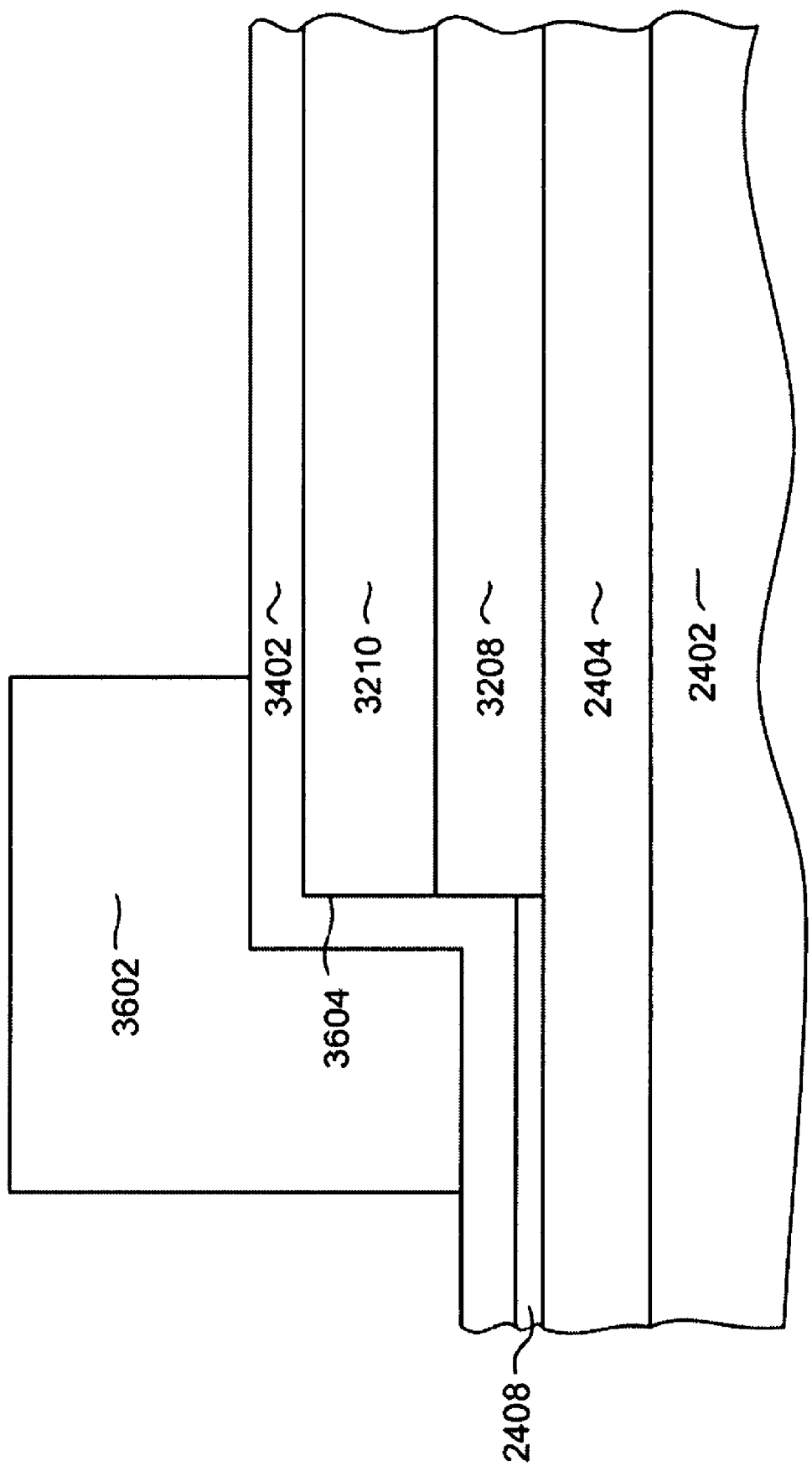

Then, with reference to FIG. 34, a non-magnetic spacer material 2402 such as Rh is deposited. Then, with reference to FIG. 35 a mask structure 3402 is formed having an opening 3404 to define a trailing magnetic shield. A magnetic material such as NiFe or CoFe is then electrically plated into the opening 3404 and the mask 3402 is lifted off, resulting in the structure as shown in side view in FIG. 36, with a trailing shield 3602 formed over the non-magnetic spacer material 3402 and having a magnetic stitched pole 3208 that defines a secondary flare point at a location 3604. The non-magnetic spacer 3210 helps to maintain a desired spacing between the stitched pole 3208 and the magnetic trailing shield, in order to avoid losing too much magnetic flux between the stitched pole 3208 and the trailing shield 3602. In FIG. 36 it can be seen that the remaining hard mask layer 2408 and non-magnetic spacer layer 3402 together define the trailing gap thickness.

With reference again to FIG. 31, it can be seen that, because both portions 3104, 3108 of the mask 3102 are formed in the same photolithographic process so that the resulting lapping guide is self aligned with the secondary flare point provided by the stitched pole 3208. As those skilled in the art will recognize, an air bearing surface will be formed when a row of sliders (not shown) is cut from a wafer, and a lapping process is performed to remove wafer material until an intended ABS plane has been reached. The electrical lapping guide greatly facilitates this process by giving an accurate indication of when lapping should be terminated. The electrical resistance of the lapping guide can be measured during lapping. As material is removed from the lapping guide, the resistance will increase, and reaching a desired lapping guide resistance indicates that the ABS location has been reached and lapping should be terminated.

Figure 37:
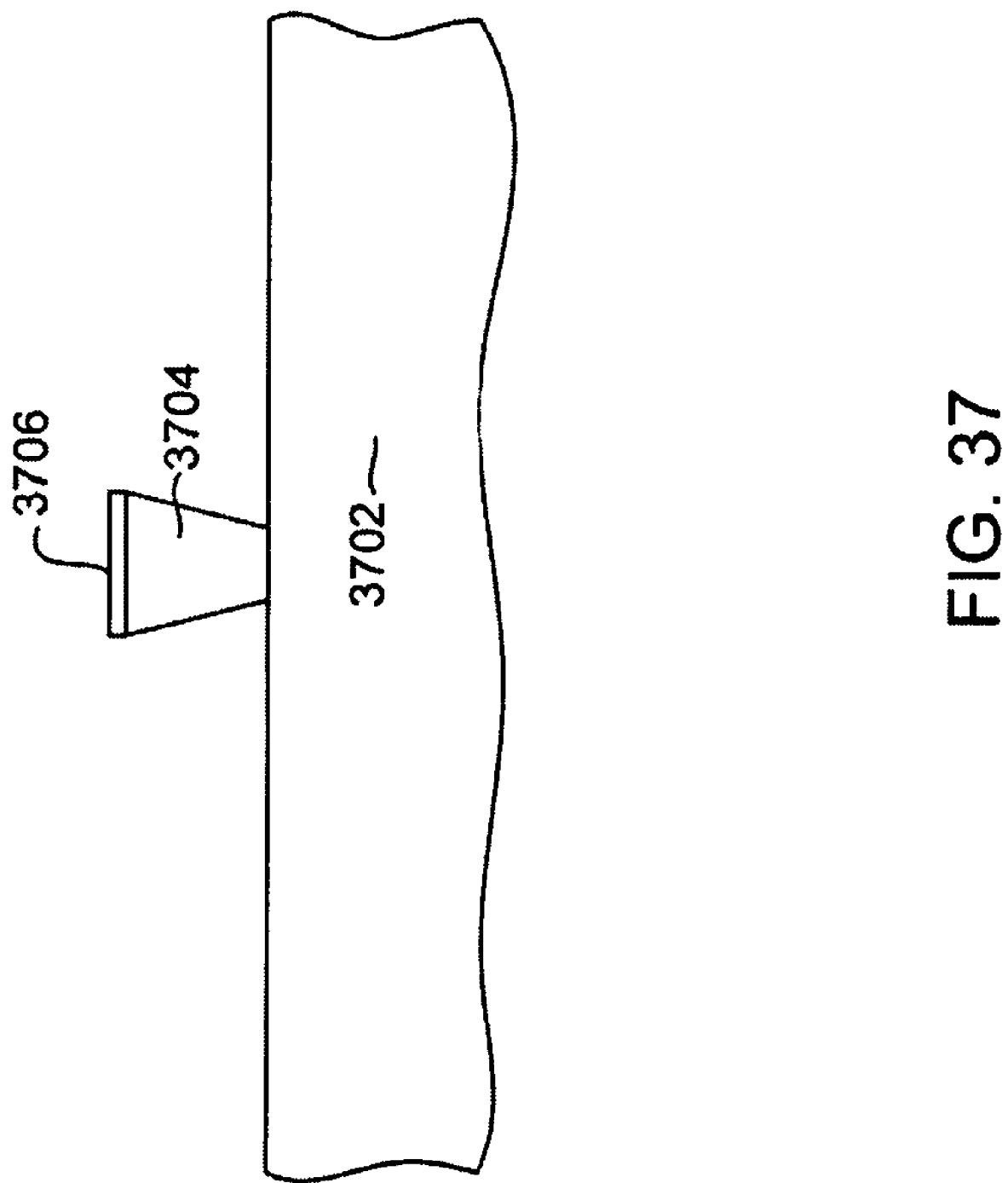
FIGS. 37-50 are illustrations of a write head in various intermediate stages of manufacture according to still another embodiment of the invention.
Figure 38:
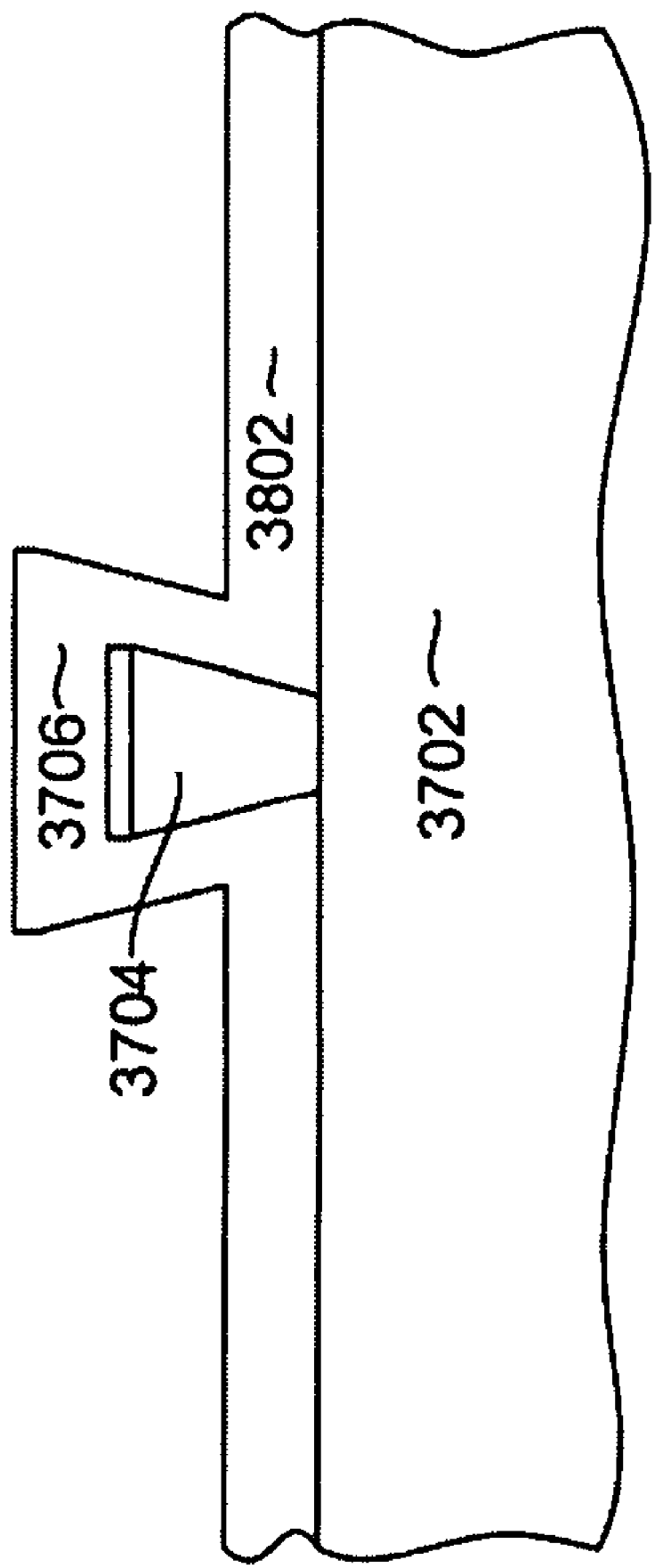

Leading Edge Tapered and Self Aligned Perpendicular Writer Process:

With reference now to FIGS. 37-50 a method for manufacturing a perpendicular write head according to yet another embodiment of the invention is described. With particular reference to FIG. 37, a substrate 3702 is provided, and a write pole 3704 is formed over the substrate. The write pole 3704 can have a hard mask layer 3706 such as Al—Ti—O formed thereover. Then, with reference to FIG. 38 a layer of non-magnetic RIEble material 3802 such as Si—N or S—C is deposited full film. The term "RIEable" is used herein to describe a material that can be readily removed by Reactive Ion Etching (RIE).

Figure 39:
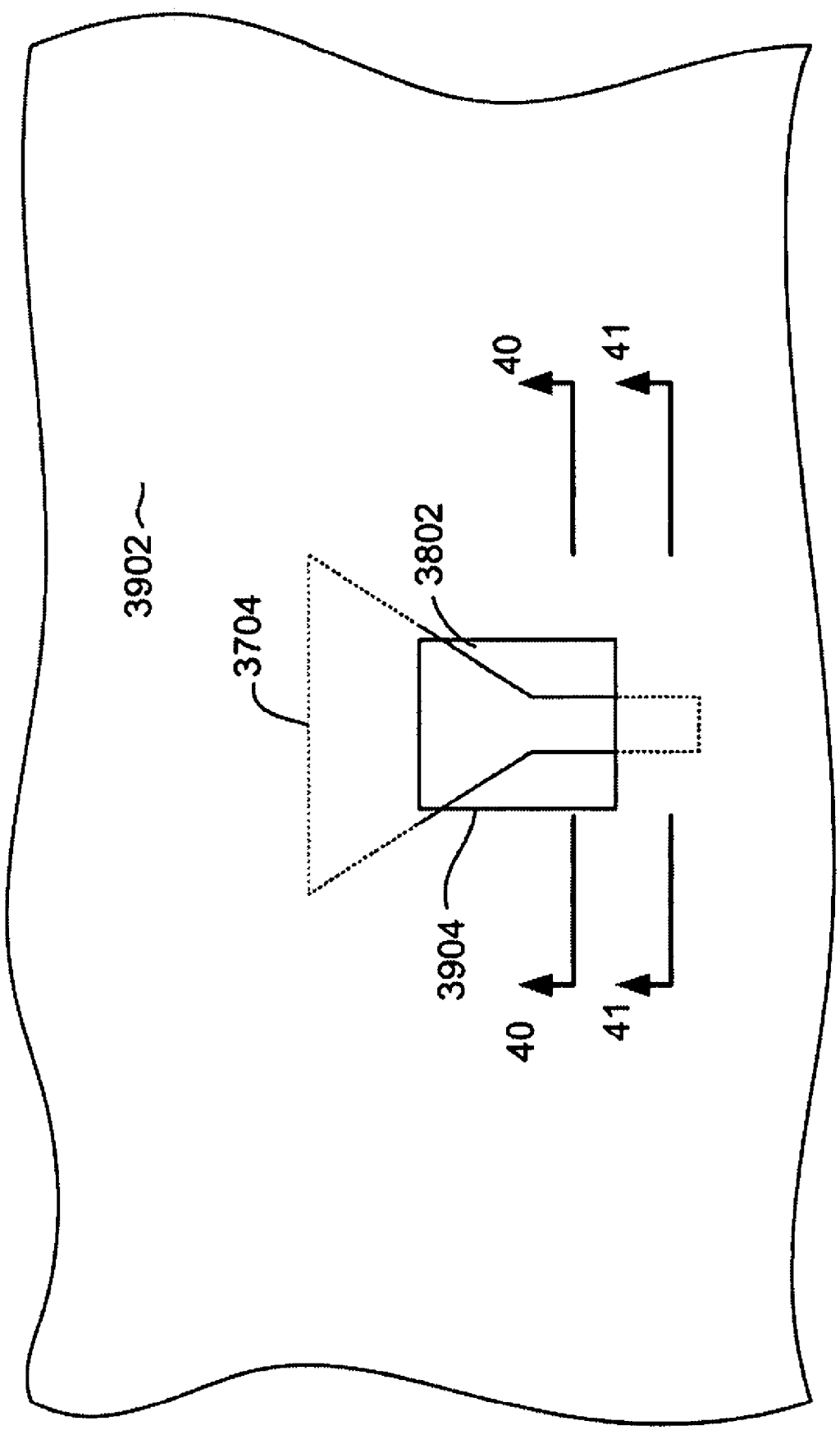
Figure 40:
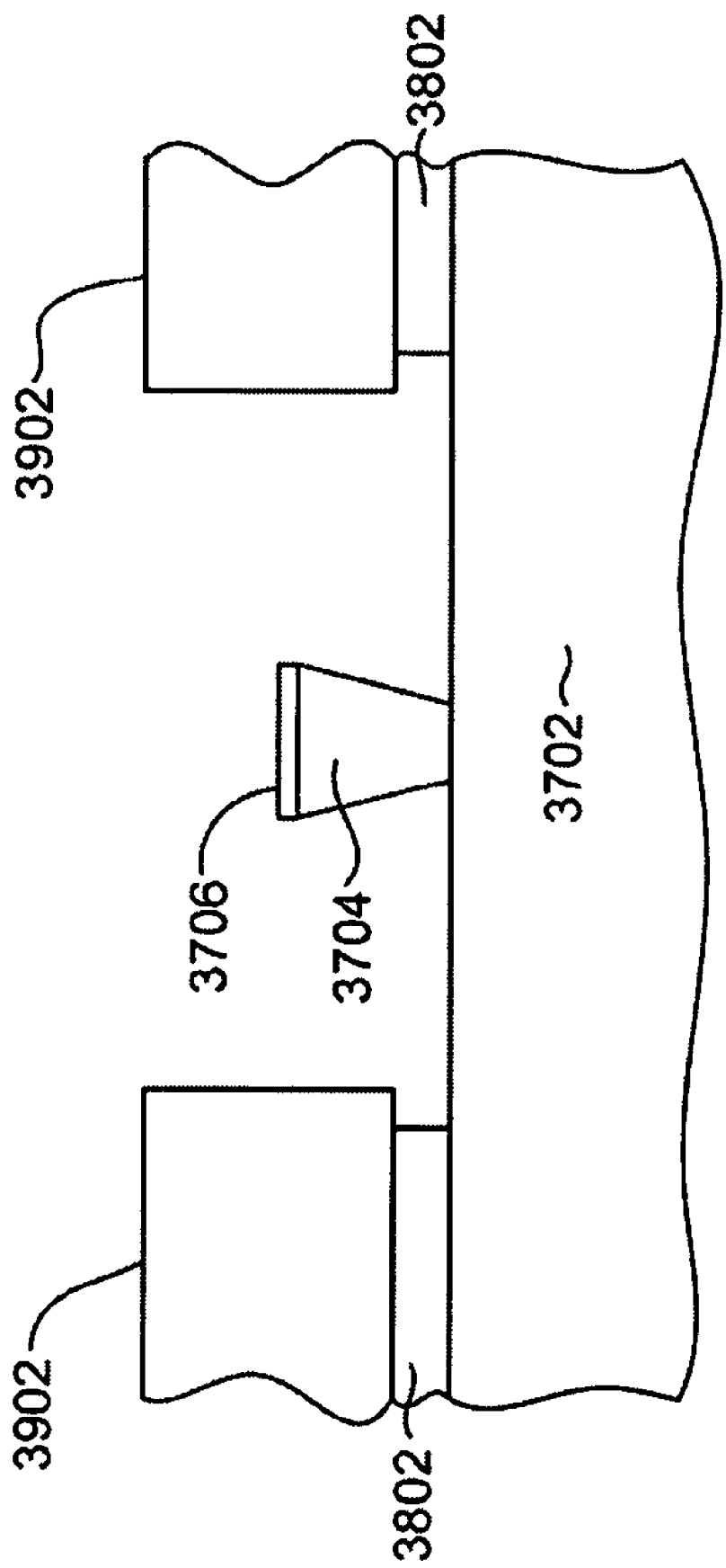
Figure 41:
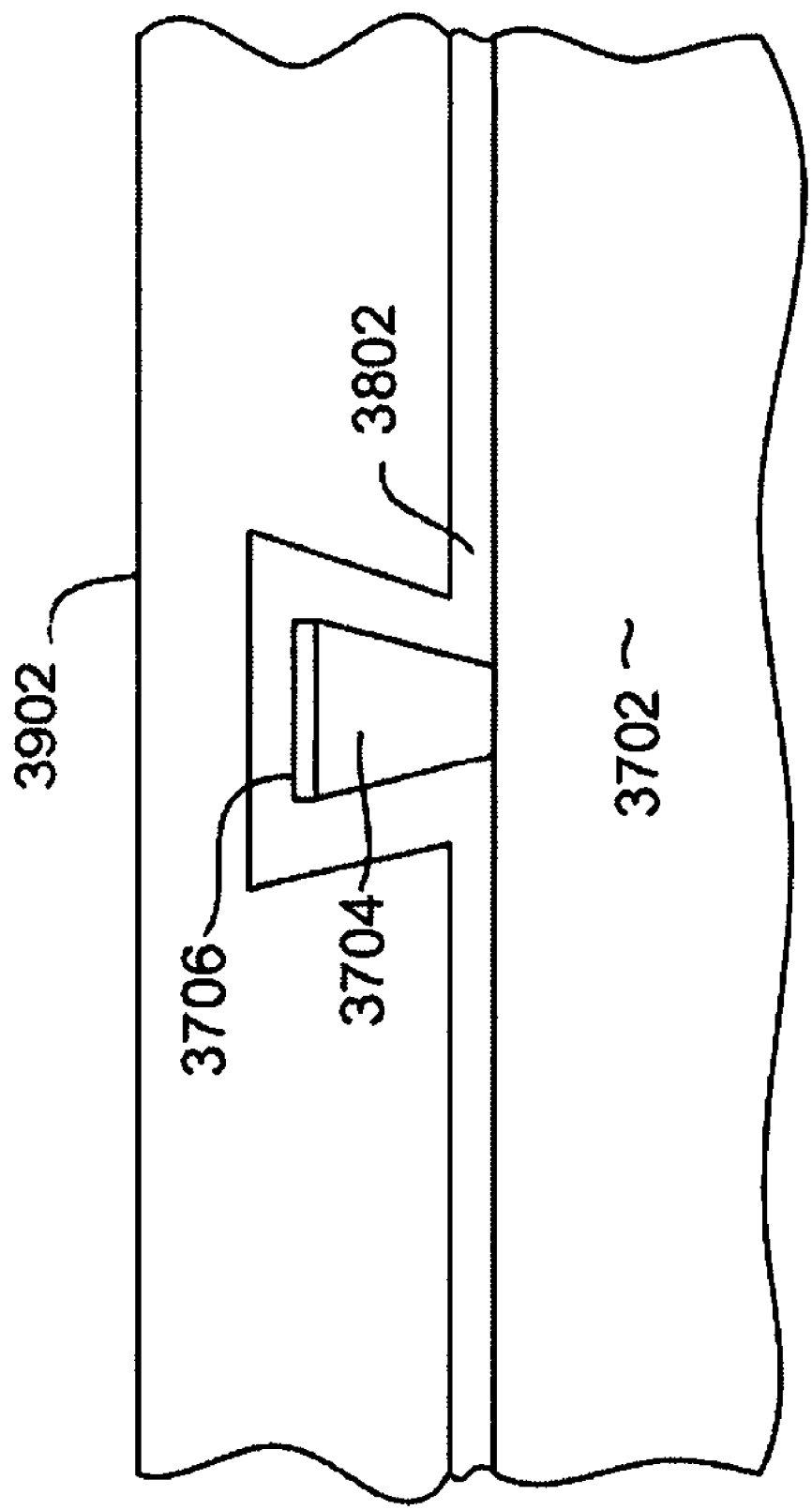
Figure 42:
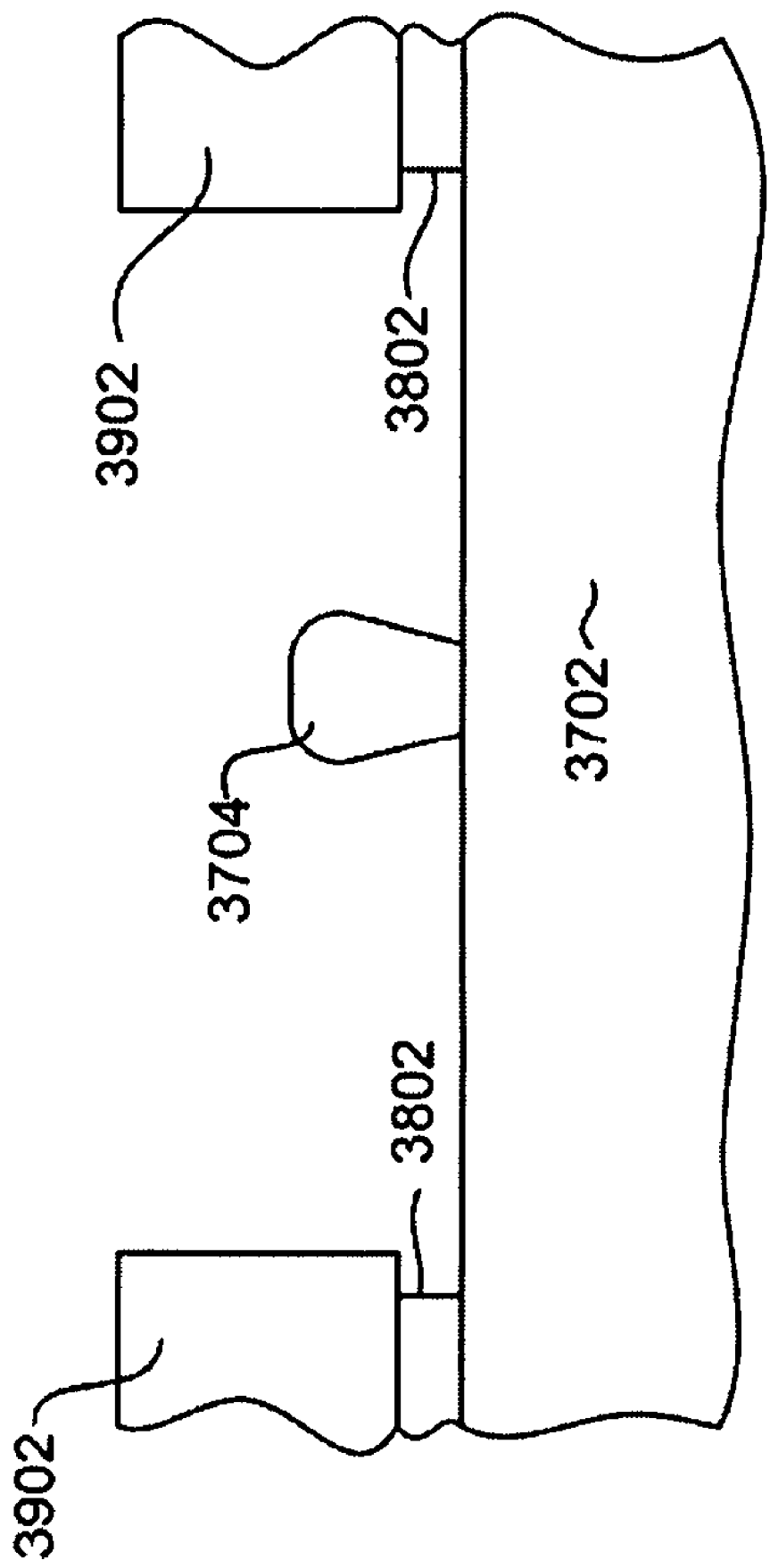
Figure 43:
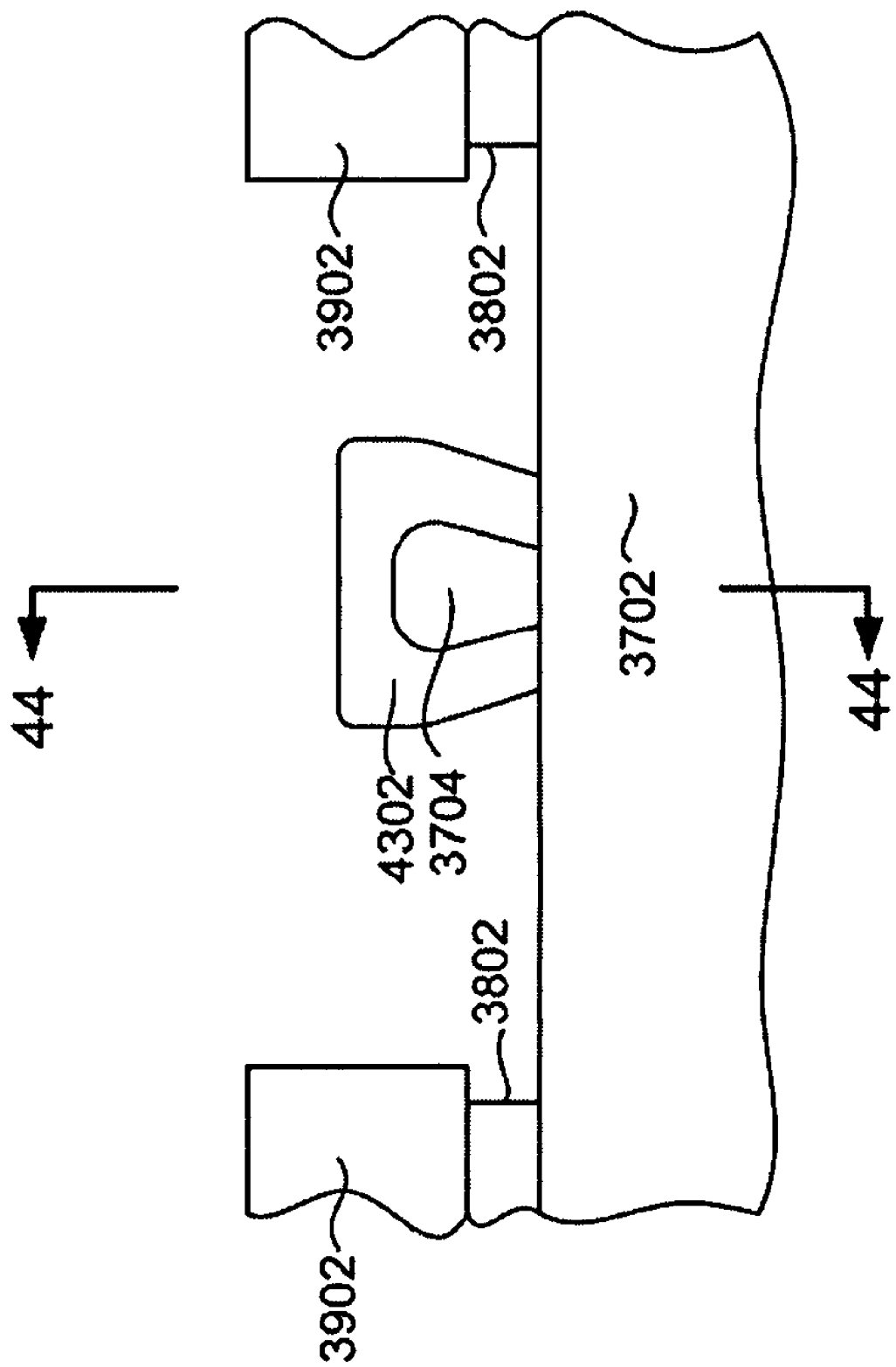
Figure 44:
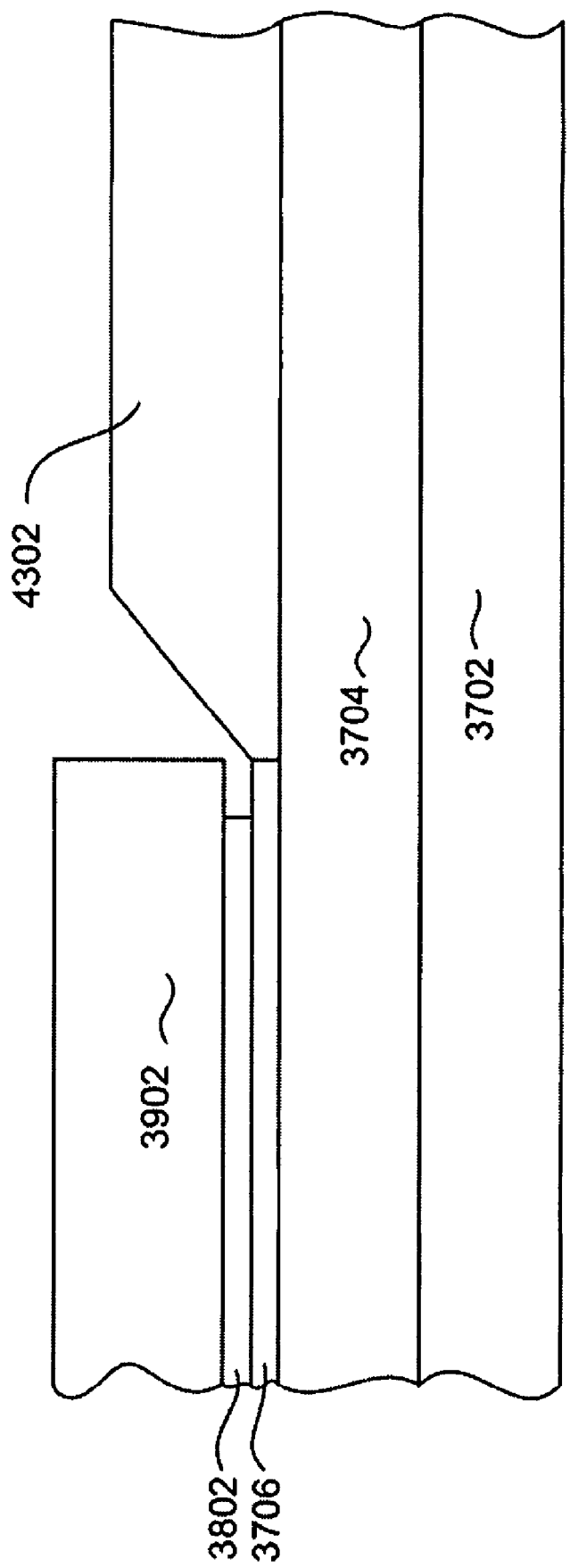
Figure 45:
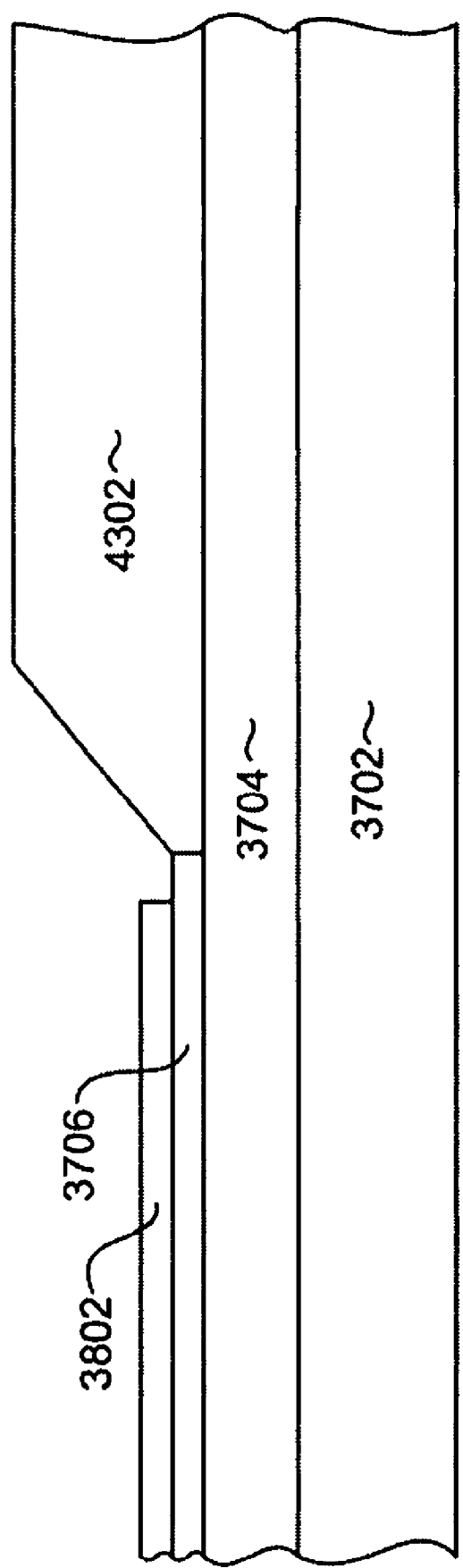

With reference to FIG. 39, which shows a top down view, a mask structure 3902 is formed over the write head 3404 and non-magnetic layer 3802. The mask has an opening 3904 configured over a portion of the write pole 3704 where a stitched pole will be formed. A reactive ion etching is then performed to remove portions of the non-magnetic layer 3802 that are not protected by the mask 3902 (i.e. portions exposed through the opening 3904) and forms an undercut, resulting in a structure as shown in FIG. 40. The portion of the write pole that is protected by the photoresist mask is shown in FIG. 41 with the non-magnetic layer 3802 still intact. Then, with reference to FIG. 42. an ion milling is performed to remove the hard mask layer 3706 (FIG. 40). The ion milling also removes a portion of the write pole 3704 in the region exposed through the opening in the mask 3902, forming a rounded write pole as shown in FIG. 42. The ion milling also removes a portion of the substrate, resulting in a notched substrate 3702 as shown. Then, with reference to FIG. 43, a magnetic material 4302 is deposited to form a stitched magnetic pole 4302. The stitched pole 4302 can be formed by a sweeping ion beam deposition which is preferably performed using a stationary chuck (i.e. the ion beam deposition is in a fixed direction and not rotating or sweeping). Shadowing from the mask layer 3902 prevent much of the magnetic stitched pole material 4302 from being deposited onto the substrate, and deposits the material 4302 primarily on the write pole 3704 as shown. Also, as seen in FIG. 44, which shows a side view, the sweeping ion beam deposition and shadowing from the mask layer 3902 causes the stitched pole 4302 to have a tapered front edge. Then, the mask 3902 can be lifted off, resulting in the structure as shown in FIG. 45, A reactive ion etch can be performed to remove the non-magnetic layer 3802 from the field.

Figure 46:
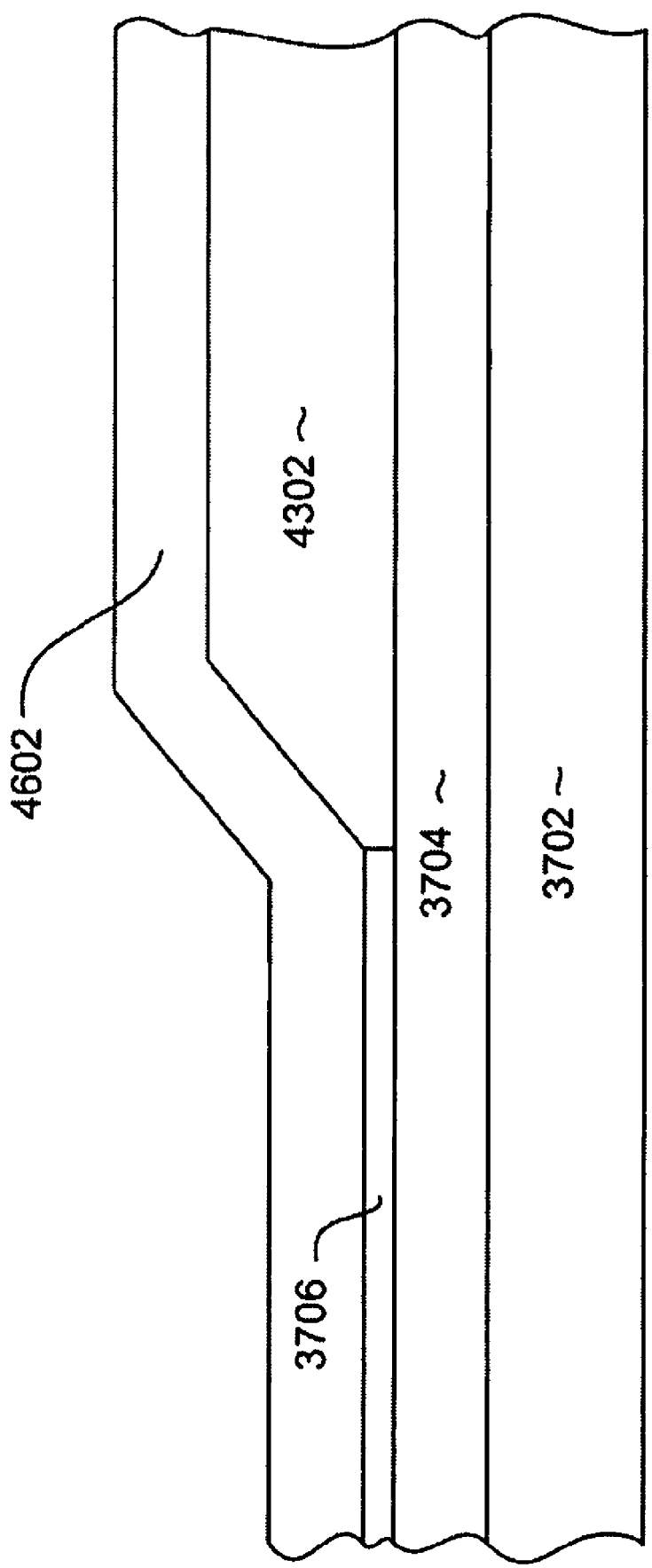
Figure 47:
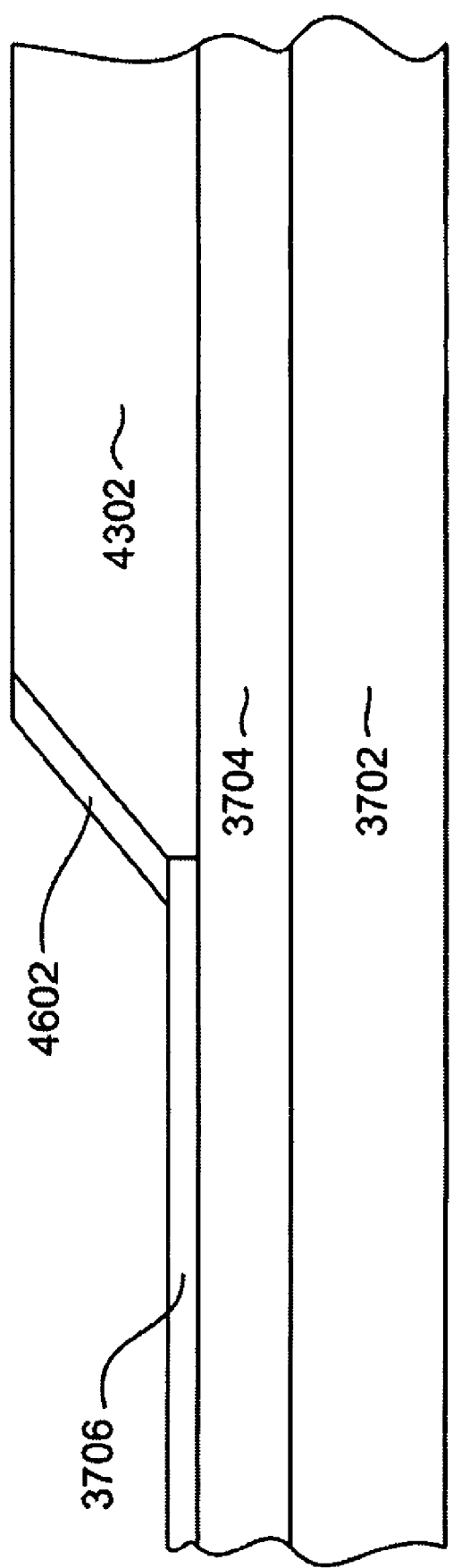

With reference now to FIG. 46, a layer of non-magnetic spacer material 4602 is deposited. This non-magnetic layer 4602 can be alumina, which can be deposited by a conformal deposition process such as atomic layer deposition (ALD) to a thickness of about 60 nm. Then, an ion mill can be performed using the layer 3706 as an end point detection layer. This ion mill removes a portion of the non-magnetic spacer layer 4602 to form desired trailing shield side gaps. The layer 3706 forms the trailing gap.

Figure 48:
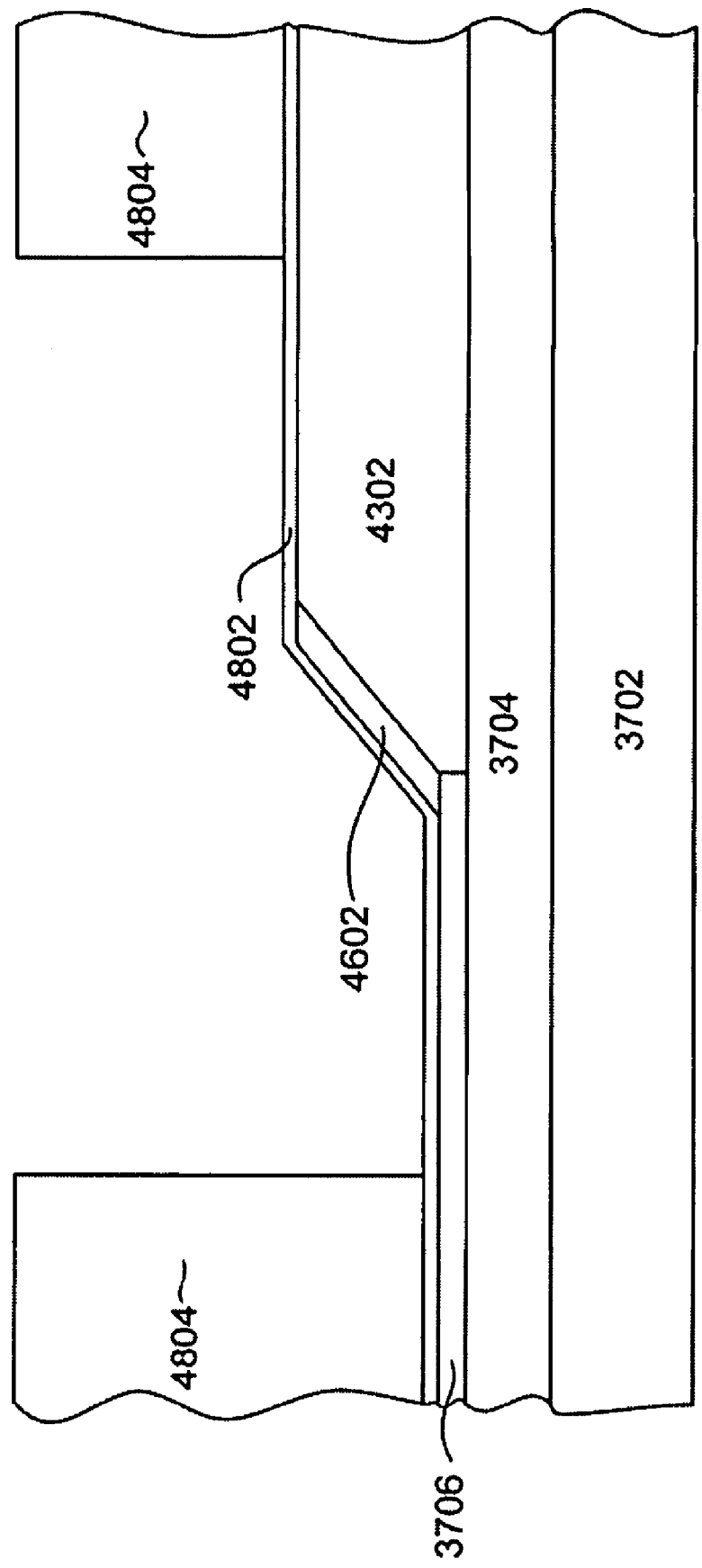
Figure 49:
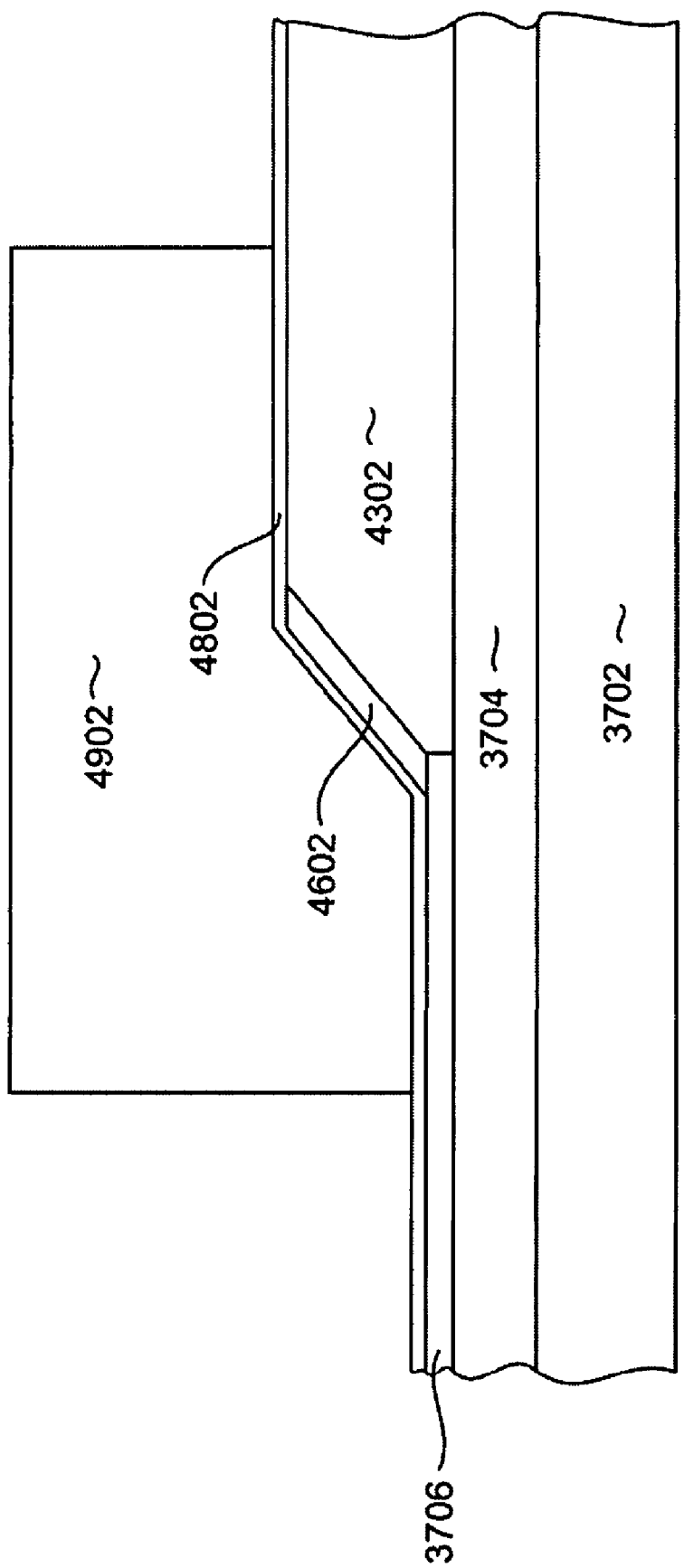
Figure 50:
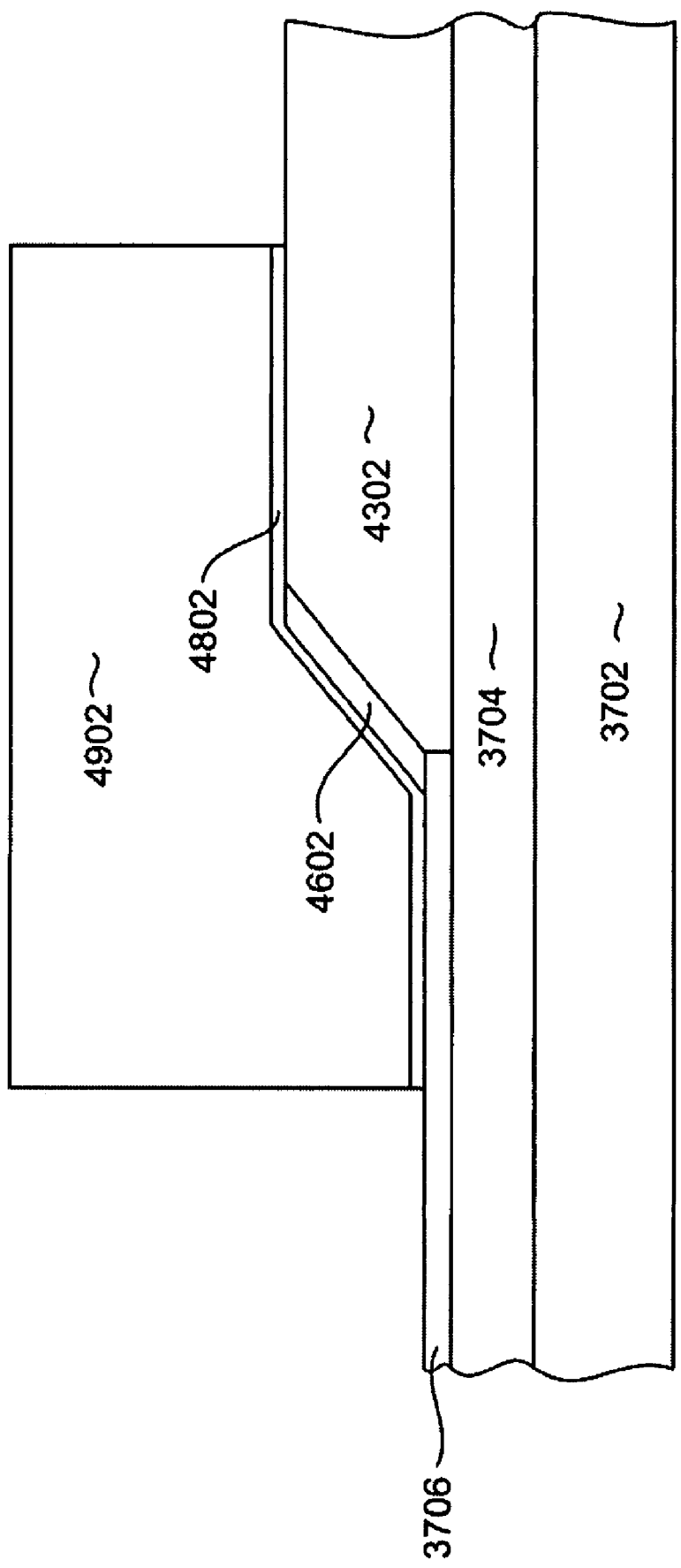

Then, with reference to FIG. 48 a non-magnetic seed layer 4802 is deposited. Then, a trailing shield mask 4804 is formed with an opening configured to define a trailing magnetic shield. A magnetic 4902 can then be plated in to the opening in the mask 4804. The mask 4802 can then be lifted off, leaving the structure as shown in FIG. 49

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:
1. A method for manufacturing a magnetic write head for perpendicular magnetic data recording, comprising:
    providing a substrate;
    forming a write pole over the substrate with a thin alumina hard mask over a trailing edge of the write pole;
    depositing a RIEable material;
    forming a mask over the write pole, thin alumina hard mask and RIEable material, the mask having a back edge that defines a secondary flare point location;
    performing a reactive ion etch (RIE) to remove the RIEable material in an area not protected by the mask;
    performing an ion milling to remove the thin alumina hard mask in an area not protected by the mask; and
    performing a sweeping ion beam deposition to deposit a magnetic material onto portions of the write pole that are not protected by the mask, the sweeping ion beam deposition being performed at an angle relative to normal so that shadowing from the mask forms a stitched magnetic pole with a tapered front edge.

2. The method as in claim 1 further comprising, performing a lapping operation to form an air bearing surface, and wherein the tapered surface of the stitched magnetic pole is formed at an angle relative to the air bearing surface.

3. The method as in claim 1 further comprising:
removing the mask;
depositing a non-magnetic material; and
forming a magnetic trailing shield over the non-magnetic material.

4. The method as in claim 1 further comprising:
removing the mask;
depositing alumina;
performing an ion milling to remove horizontally disposed portions of the alumina;
depositing Rh; and
depositing a magnetic trailing shield.

5. The method as in claim 1 wherein the RIEable material comprises a material selected from the group consisting of Si—C and Si—N.

6. The method as in claim 1 wherein the reactive ion etching produces an undercut in the non-magnetic RIEable material.

* * * * *